US012088126B2

(12) United States Patent
Nord

(10) Patent No.: US 12,088,126 B2
(45) Date of Patent: Sep. 10, 2024

(54) DOCKING STATION WITH SPATIALLY-ADJUSTED WIRELESS ENERGY TRANSFER AND DIGITAL OFFLOADING

(71) Applicant: Jonathan Nord, Jasper, IN (US)

(72) Inventor: Jonathan Nord, Jasper, IN (US)

( * ) Notice: Subject to any disclaimer, the term of this patent is extended or adjusted under 35 U.S.C. 154(b) by 387 days.

(21) Appl. No.: 17/617,417

(22) PCT Filed: Jun. 8, 2020

(86) PCT No.: PCT/US2020/036611
§ 371 (c)(1),
(2) Date: Dec. 8, 2021

(87) PCT Pub. No.: WO2020/247916
PCT Pub. Date: Dec. 10, 2020

(65) Prior Publication Data
US 2022/0255372 A1    Aug. 11, 2022

Related U.S. Application Data

(60) Provisional application No. 62/858,657, filed on Jun. 7, 2019.

(51) Int. Cl.
*H02J 50/10* (2016.01)
*G06F 1/16* (2006.01)
(Continued)

(52) U.S. Cl.
CPC ............ *H02J 50/90* (2016.02); *G06F 1/1632* (2013.01); *H02J 50/005* (2020.01); *H02J 50/40* (2016.02); *H02J 50/80* (2016.02)

(58) Field of Classification Search
CPC .......... H02J 50/10; H02J 50/40; H02J 50/402; H02J 50/80; H02J 50/90; H02J 7/0048
See application file for complete search history.

(56) References Cited

U.S. PATENT DOCUMENTS 5,821,731 A   10/1998  Kuki et al.
7,952,322 B2   5/2011  Partovi et al.
(Continued)

FOREIGN PATENT DOCUMENTS

CN          206432788       8/2017
WO     WO2009047768 A2     4/2009

*Primary Examiner* — Patrick O Neill
(74) *Attorney, Agent, or Firm* — Jenei LLC

(57) ABSTRACT

A docking station includes a charging tray mountable to an underside of a surface that is formed of an electromagnetic transmissive material. A mobile wireless energy transfer unit is smaller than the surface and is received for movement on the charging tray. A detection system detects a position on the surface of an electrical device. An alignment system positions the mobile wireless energy transfer unit on the charging tray. A controller is communicatively coupled to the mobile wireless energy transfer unit, detection system, and alignment system. The controller executes a docking application that enables the docking station to: (i) determine, based on an input signal received from the detection system, the position of the electrical device; (ii) control the alignment system to position the mobile wireless energy transfer unit beneath the electrical device; and (iii) activate the mobile wireless energy transfer unit to wirelessly charge the electrical device.

12 Claims, 21 Drawing Sheets

(51) Int. Cl.
*H02J 50/00* (2016.01)
*H02J 50/40* (2016.01)
*H02J 50/80* (2016.01)
*H02J 50/90* (2016.01)

(56) References Cited

U.S. PATENT DOCUMENTS

| | | | |
|---|---|---|---|
| 8,067,921 B2* | 11/2011 | Sip | H02J 7/0042 |
| | | | 320/108 |
| 8,305,036 B2* | 11/2012 | Toya | H02J 7/0042 |
| | | | 320/108 |
| 9,112,364 B2 | 8/2015 | Partovi | |
| 9,184,632 B2 | 11/2015 | Kirby et al. | |
| 9,484,751 B2 | 11/2016 | Byrne et al. | |
| 9,572,424 B2 | 2/2017 | Metcalf | |
| 9,722,449 B2 | 8/2017 | Jung | |
| 2012/0146579 A1* | 6/2012 | Shukuya | G12B 5/00 |
| | | | 320/108 |
| 2014/0021798 A1 | 1/2014 | Kesler et al. | |
| 2014/0054961 A1 | 2/2014 | Metcalf et al. | |
| 2015/0123484 A1 | 5/2015 | Kurs et al. | |
| 2018/0323636 A1* | 11/2018 | Makwinski | H02J 7/0042 |

\* cited by examiner

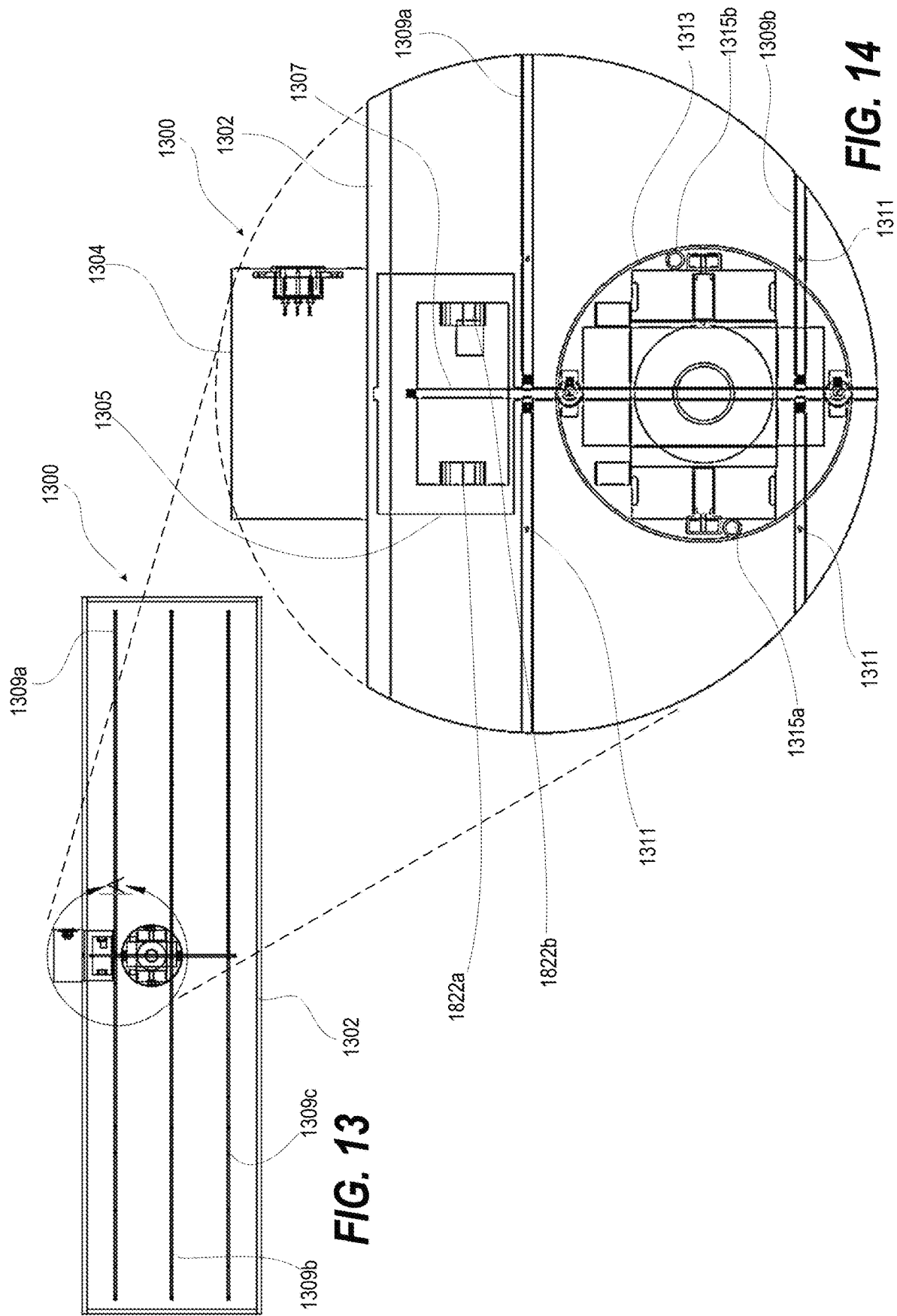

DOCKING STATION WITH SPATIALLY-ADJUSTED WIRELESS ENERGY TRANSFER AND DIGITAL OFFLOADING

CROSS-REFERENCE TO RELATED APPLICATIONS

This application claims the benefit of priority under 35 U.S.C. § 119(e) to U.S. Provisional Application Ser. No. 62/858,657, entitled "DOCKING STATION WITH SPATIALLY-ADJUSTED WIRELESS ENERGY TRANSFER AND DIGITAL OFFLOADING", filed Jun. 7, 2019, the contents of which are hereby incorporated by reference in their entirety for any purpose.

BACKGROUND

1. Technical Field

The present disclosure generally relates to wireless recharging systems, and more specifically to wireless recharging system for a large surface.

2. Description of the Related Art

With ever increasing numbers of electrical devices and especially mobile electronic devices, users are challenged to keep these devices charged for use. Often the portability of such devices presents challenges in computational capacity, digital storage, and network connectivity with each device being stand alone. A consumer can find it daunting to individually link and configure a number of different mobile electronic devices from different manufacturers.

BRIEF SUMMARY

In one aspect, the present disclosure provides a docking station having a charging apparatus mountable to an underside of a surface that is formed of an electromagnetic transmissive material. The docking station includes a mobile wireless energy transfer unit that is smaller than the surface. The mobile wireless energy transfer unit is received for movement on the charging apparatus. A detection system detects a position on the surface of an electrical device that is rechargeable by the mobile wireless energy transfer unit. An alignment system positions the mobile wireless energy transfer unit on the charging apparatus. A controller is communicatively coupled to the mobile wireless energy transfer unit, the detection system, and the alignment system. The controller executes a docking application that enables the docking station to: (i) determine, based on an input signal received from the detection system, the position of the electrical device; (ii) control the alignment system to position the mobile wireless energy transfer unit beneath the electrical device; and (iii) activate the mobile wireless energy transfer unit to wirelessly charge the electrical device.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 13 is a top view of an example docking system having a charging tray, according to one or more embodiments;

FIG. 14 is a top detailed view of the example docking system of FIG. 13, according to one or more embodiments;

DETAILED DESCRIPTION

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

Figure 1:
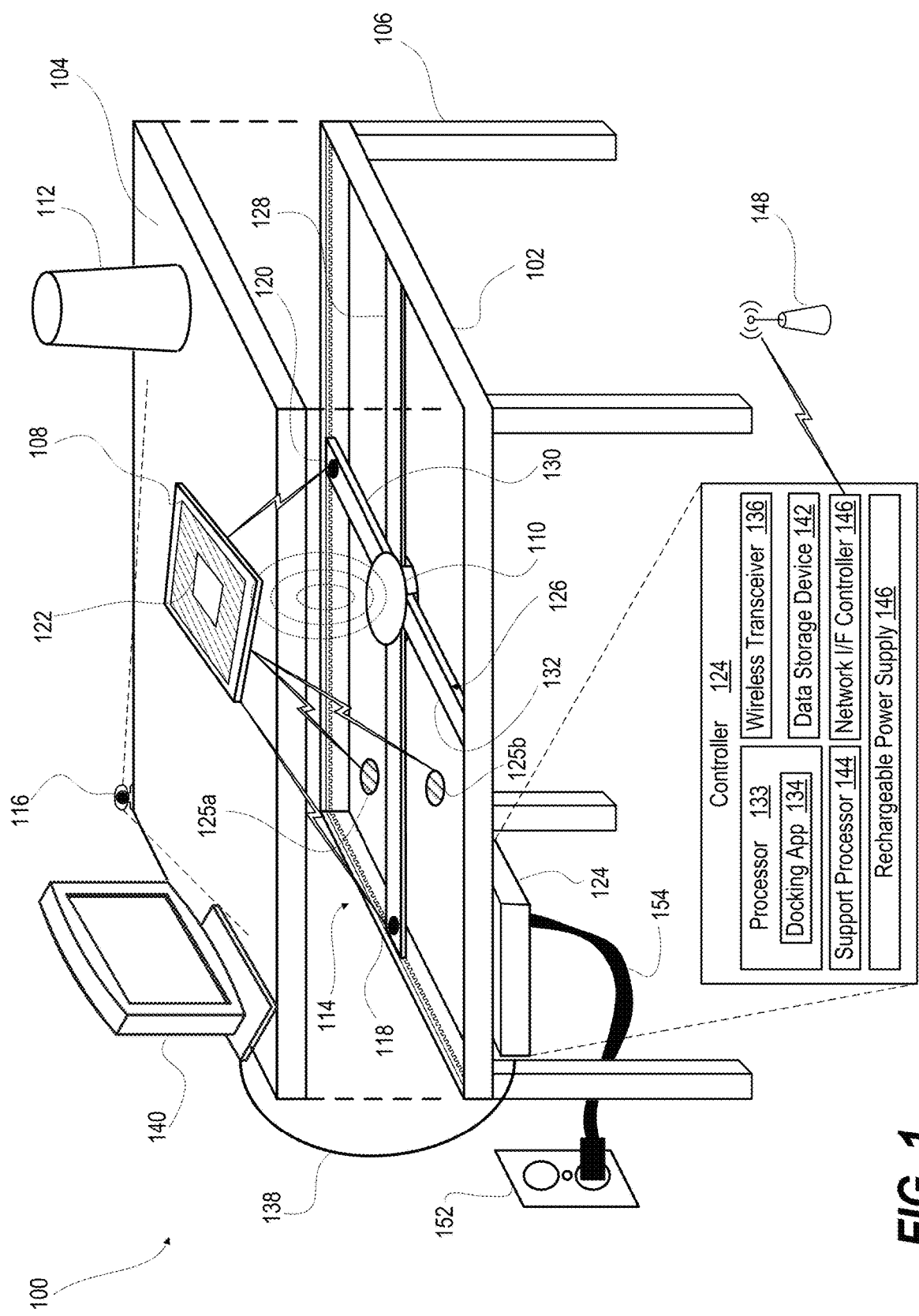
FIG. 1 is an isometric diagram of a docking station having a charging tray mountable during original manufacture or as a retrofit to an underside of a surface of a table or other convenient structure, according to one or more embodiments.

FIG. 1 is an isometric diagram of a docking station 100 having a charging apparatus depicted as a charging tray 102 mountable during original manufacture or as a retrofit to an underside of a surface 104 of a table 106 or other convenient structure. For clarity, surface 104 is planar, although surface 104 can be curved. The surface 104 is formed of an electromagnetic transmissive material such as wood that allows wireless inductive charging of a first electrical device 108 placed on the surface 104 by a mobile wireless energy transfer unit ("rover") 110 that is received for movement on the charging tray 102. In one or more embodiments, the rover 110 can sequentially charge additional devices, such as second electrical device 112. The rover 110 is smaller than the surface 104 to provide an economical apparatus but is movable for use on an expansive surface 104.

A detection system 114 detects a position on the surface 104 of the first and second electrical devices 108, 112. In one embodiment, the detection system 114 is capable to solely locate the first and second electrical devices 108, 112, such as using an image capturing device 116. In one or more embodiments, the detection system 114 includes participation by the first and second electrical devices 108, 112. For example, first and second radio frequency (RF) beacons 118, 120 are coupled to spaced apart positions on a selected one of the surface 104 and the charging tray 102. An application 122 executed by the first electrical device 108 reports sensing the beacons 118, 120 to a controller 124 of the docking station 100. For another example, the first electrical device 108 transmits a signal, such as using personal access network (PAN) or wireless local access network (WLAN) protocols. The detection system 114 includes spaced apart receivers 125a, 125b that detect respective directions of the first electrical device 108 to the controller 124. The controller 124 triangulates the position of the first electrical device 108 based on the respective directions. The controller 124 of the rover 110 determines an energy transfer unit position on the charging tray 102.

The controller 124 controls an alignment system 126 to position the rover 110 beneath the first electrical device 108 based on the device and energy transfer unit positions. In one or more embodiments, an alignment system 126 includes gantry mechanism 128 having a lateral positioning mechanism and a longitudinal positioning mechanism that enable lateral and longitudinal positioning of the first electrical device 108. For example, a first transverse bar 130 can be positioned along one of a longitudinal axis and a lateral axis. The wireless mobile energy transfer unit 110 either positions itself along the first transverse bar 130 for positioning along the other one of the longitudinal and lateral axes. Alternatively, a second transverse bar 132 that is orthogonal to the first transverse bar 130 moves the wireless mobile energy transfer unit 110 along the first transverse bar 130. In one or more embodiments, the gantry mechanism includes spider leg-like actuators (not shown) that adjust distance from sidewalls of the charger tray 102 to provide two-dimensional positioning. In one or more embodiments, the gantry mechanism 128 operates like skycam in a sports arena, simultaneously moving along two crossed guide cables to change two-dimensional position.

The controller 124 is communicatively coupled to the rover 110, the detection system 114, and the alignment system 126. A processor 133 of controller 124 executes a docking application 134 in memory that enables the docking station 100 to: (i) determine, based on an input signal received from the detection system 114, the position of the first electrical device 108; (ii) control the alignment system 126 to position the rover 110 beneath the first electrical device 108; and (iv) activate the rover 110 to wirelessly charge the electrical device 108.

In one or more embodiments, the controller 124 can determine a higher priority of the first and second electrical devices 108, 112 for recharging. For example, a user setting can make the first electrical device 108 a charge first device. For another example, the controller 124 can determine which one of the first and second electrical devices 108, 112 is in need of charging and full charge each in that order. For an additional example, the controller 124 can determine schedule a repositioning schedule to partially charge each one of the first and second electrical devices 108, 112 in a repetitive manner until one of the devices 108, 112 is taken away or until the devices 108, 112 are fully charged.

In one or more embodiments, the controller 124 of the docking system 100 is communicatively coupled to a wireless transceiver 136 that communicates with the electrical device 108. In a particular embodiment, the wireless mobile energy transfer unit 110 includes the wireless transceiver 136. A network link 138 is communicatively coupled between the wireless transceiver 136 and a user interface device 140 such as a monitor to present content received from the electrical device 108.

Figure 2:
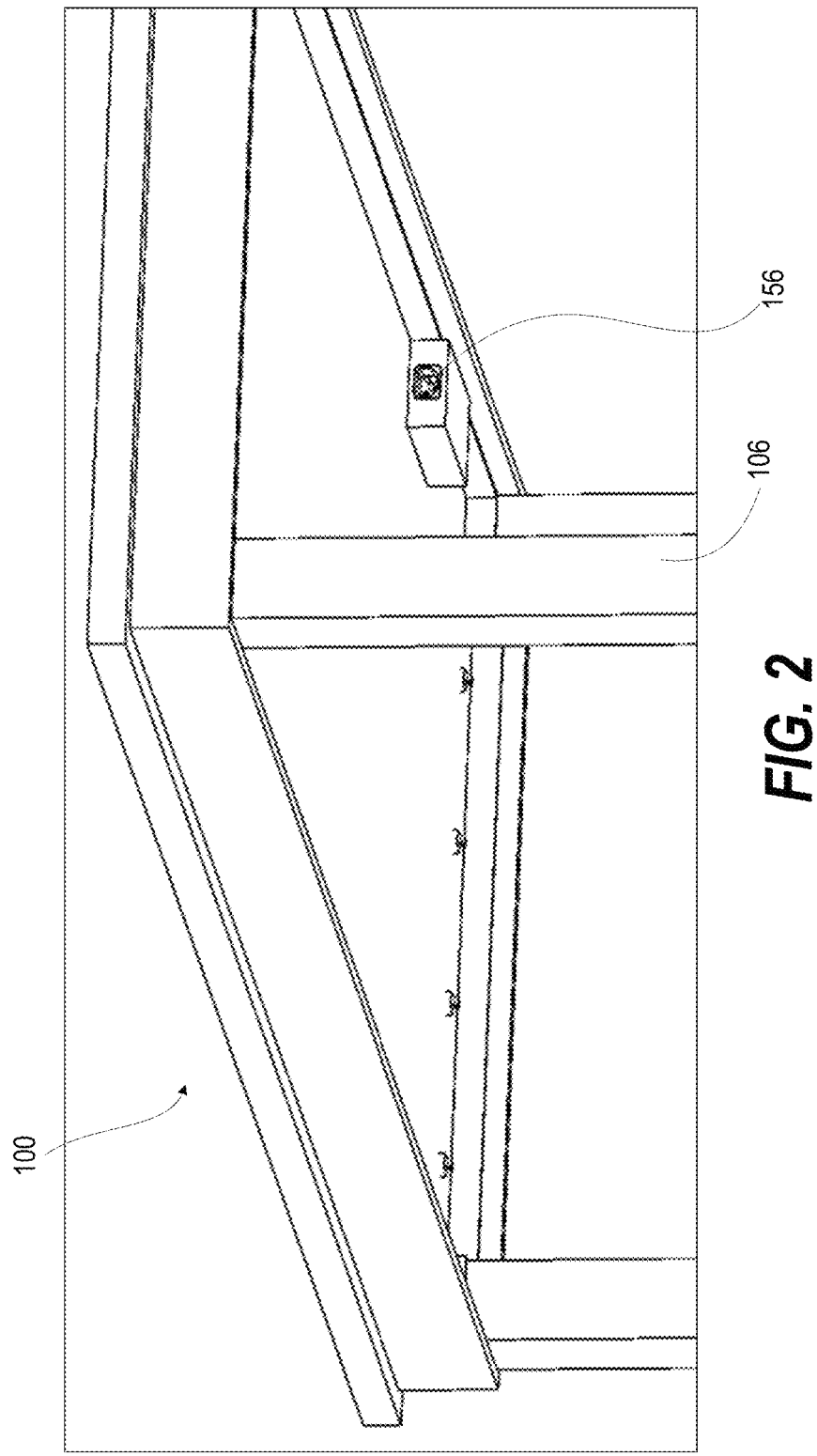
FIG. 2 is an isometric view of the table 106 looking up at a power receptacle 156 that receives the electrical cord, according to one or more embodiments.

In one or more embodiments, the controller 124 of the docking system 100 includes a data storage device 142 such as a solid state drive (SSD) or a hard disk drive (HDD) that is communicatively coupled to the wireless transceiver 136 for access by electrical device 108. Data storage device 142 supports at least one of: (i) storing content received from the electrical device 108; and providing content to the electrical device 108. In one or more embodiments, the controller 124 of the docking system 100 includes a support processor 144 such as a graphics processing unit (GPU) or a digital signal processor (DSP) that is communicatively coupled to the wireless transceiver 136 to process data received from the electrical device 108. In one or more embodiments, the controller 124 of the docking system 100 includes a wireless local access network (LAN) network interface controller (NIC) communicatively coupled to a WLAN node 148. NIC 146 provides network connection for the electrical device 108. In one or more embodiments, the controller 124 of the docking system 100 includes a rechargeable battery power supply 150 that powers the detection system 114, the alignment system 126, the rover 110, and the controller 124. An electrical outlet 152 when available recharges rechargeable battery power supply 150 via an electrical cord 154. FIG. 2 is an isometric view of the table 106 looking up at a power receptacle 156 that receives the electrical cord 154.

Figure 3:
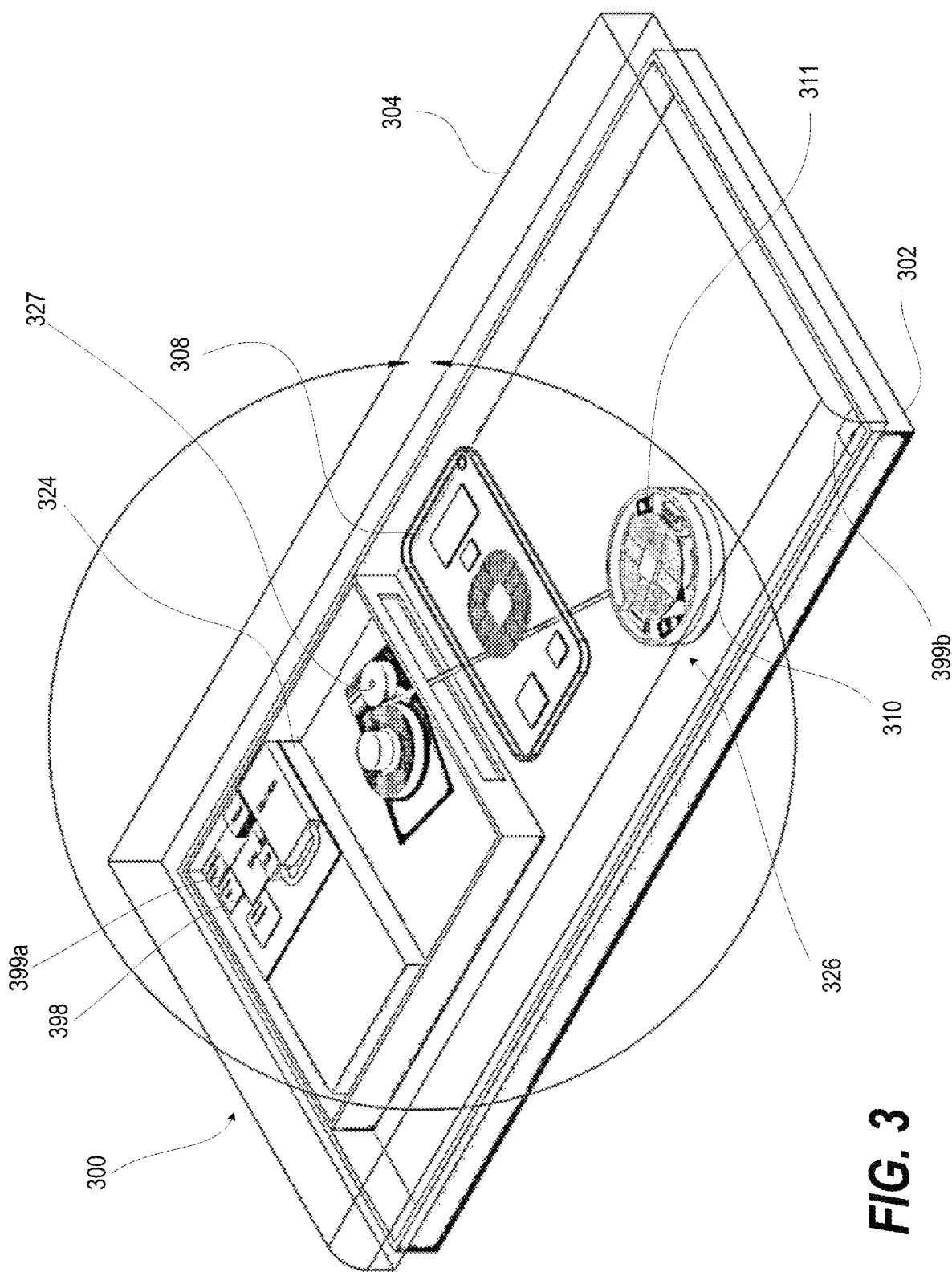
FIG. 3 is top isometric view of an example docking system with a charging tray viewable through a surface illustrated with phantom lines, according to one or more embodiments.
Figure 4:
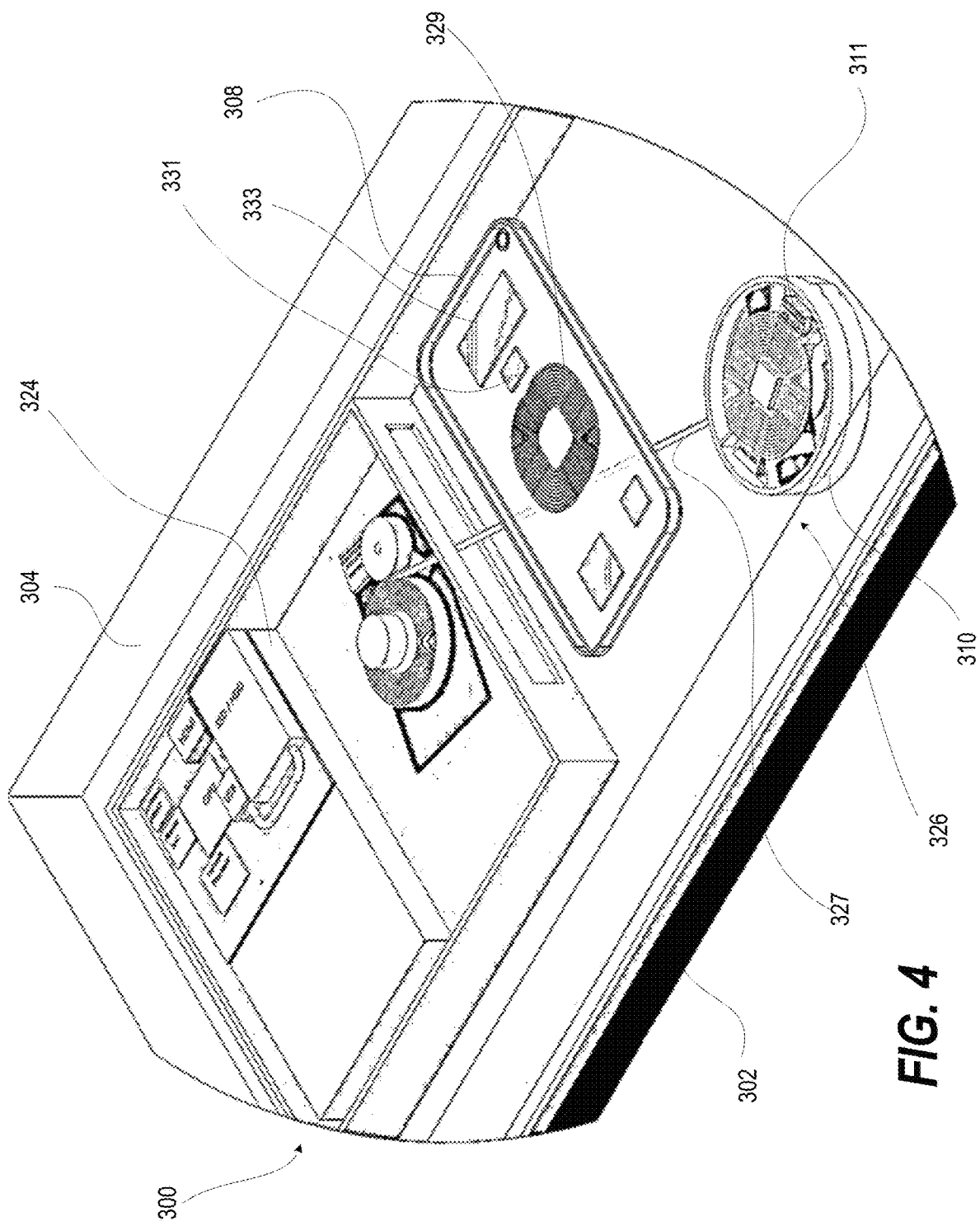
FIG. 4 is a detail view of the example docking system, according to one or more embodiments.

FIG. 3 is top isometric view of an example docking system 300 with a charging tray 302 viewable through a surface 304 illustrated with phantom lines. FIG. 4 is a detail view of the example docking system 300. Electrical device 308 is placed on top of the surface 304 by an alignment system 326 that relies upon a mobile wireless energy transfer unit ("rover") 310 having a motorized wheel drive system 311 that is electrically coupled to a controller 324 via a spooled cable 327. Rover 310 rolls on charging tray 302 to an appropriate location for efficient energy transfer to receiving loop 329 the electrical device 308. Electrical energy coupled into receiving loop 329 is converted by receiver/charger circuitry 331 for charging battery 333 of the electrical device 308.

Figure 5:
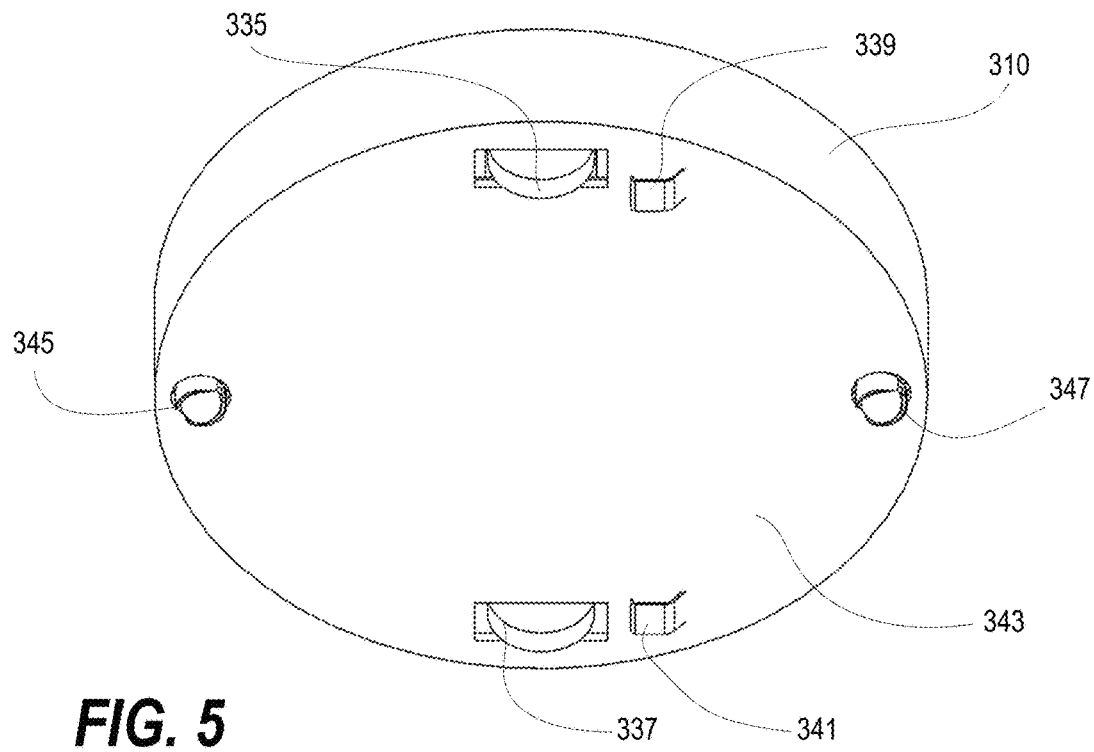
FIG. 5 is an isometric bottom view of the mobile wireless energy transfer unit having two wheels, according to one or more embodiments.

FIG. 5 is an isometric bottom view of the rover 310 having two wheels 335, 337 that are tangentially oriented and aligned on a first diameter. Each wheel 335, 337 is flanked by a respective skid plate 339, 341 formed in a lower puck-shaped housing 343. Spaced on an orthogonal diameter, a pair of roller balls 345, 347 are horizontally aligned with the wheels 335, 337 to support the rover 310.

Figure 6:
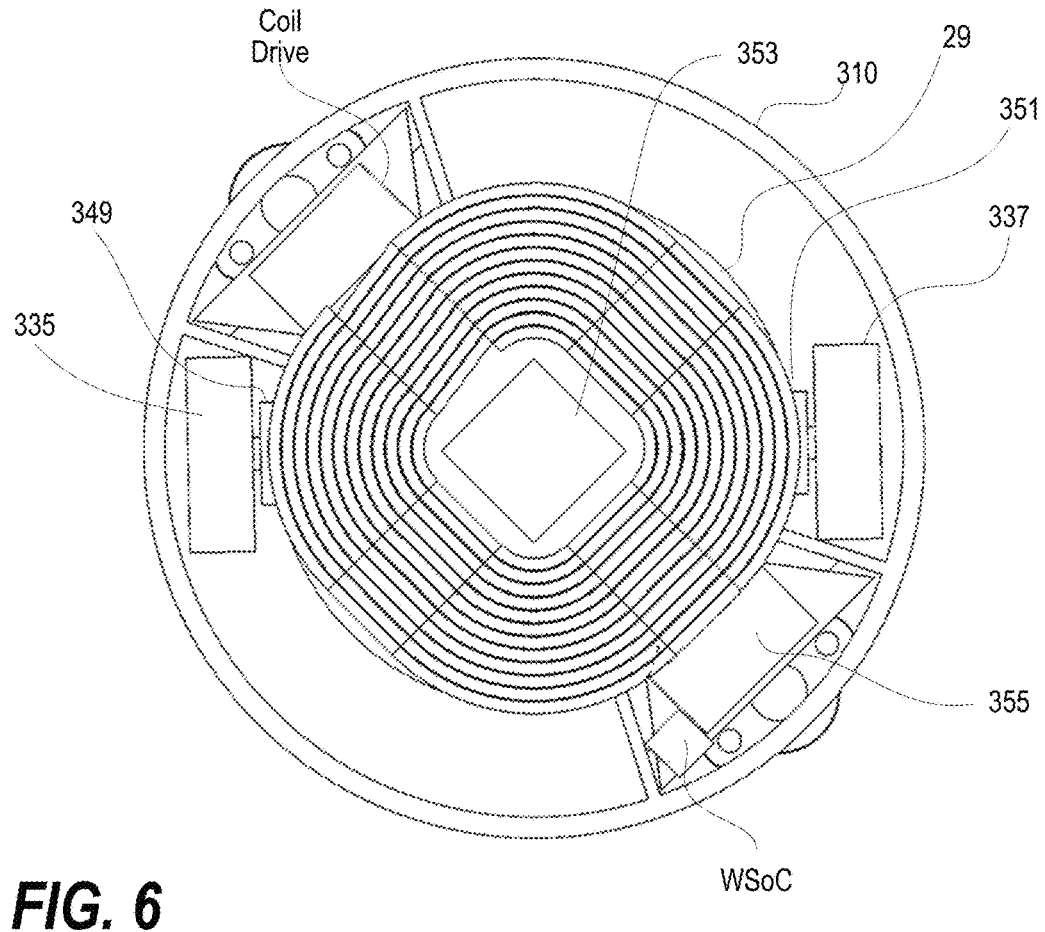
FIG. 6 is a top view of the mobile wireless energy transfer unit having the lower puck-shaped housing removed, according to one or more embodiments.

FIG. 6 is a bottom view of the rover 310 having the lower puck-shaped housing 343 (FIG. 5) removed. Wheels 335, 337 are driven respectively by motors 349, 351 whose axles are disposed about a common axis. This common axis is then mounted to a center pivot, whereby this common axis can vary about an angle of alpha, a, relative to the position where the cable 327 connects to the rover 310. An angular optical encoder 353 is mounted with its shaft rotating as alpha increases and decreases. Output pulses from optical encoder 353 are routed to microcontroller 355 that includes wireless communication and steer/move and power control by controlling torque and speed of motors 349, 351. Using the feedback from the encoder 353 and control of motors 349, 351, microcontroller 355 implements digital closed loop control of the angle, alpha α, to be approx. 90 degrees or zero degrees relative to the location where cable 327 attaches to rover 310.

Figure 7:
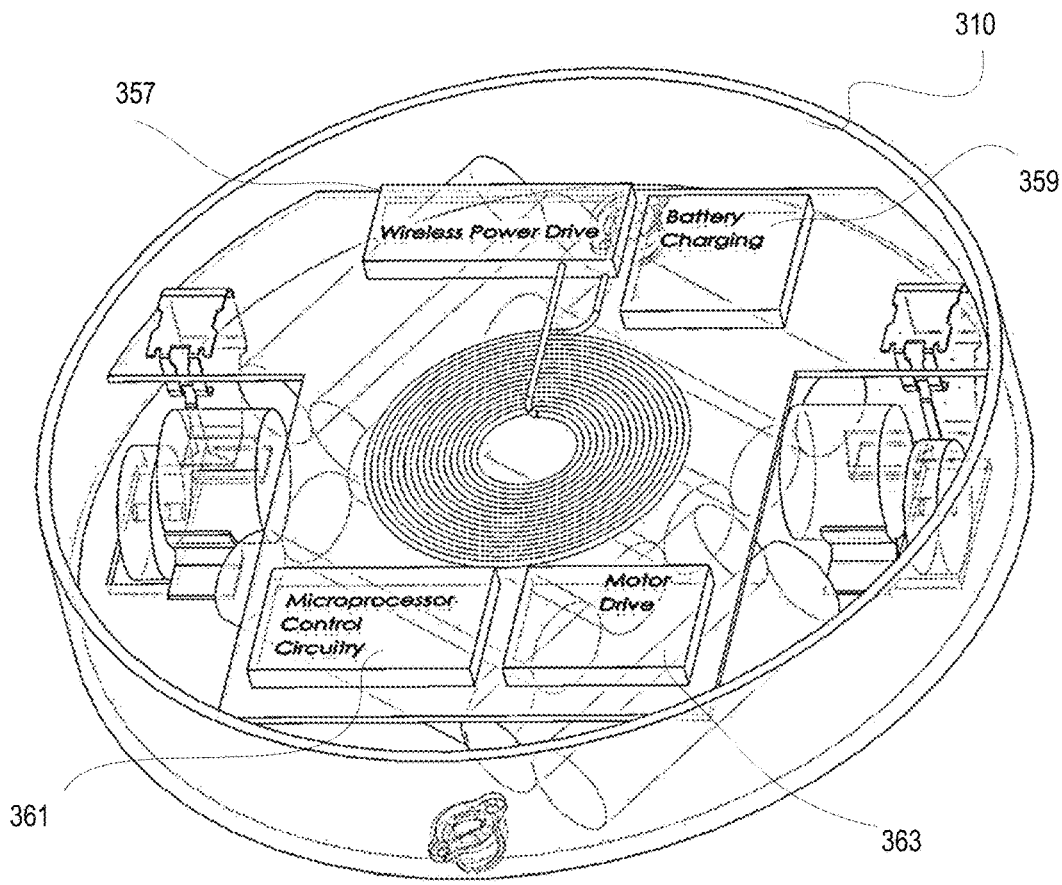
FIG. 7 is a top isometric view of the mobile wireless energy transfer unit with a top cover removed exposing wireless power drive, battery charging component, microprocessor control circuitry and motor drive, according to one or more embodiments.
Figure 8:
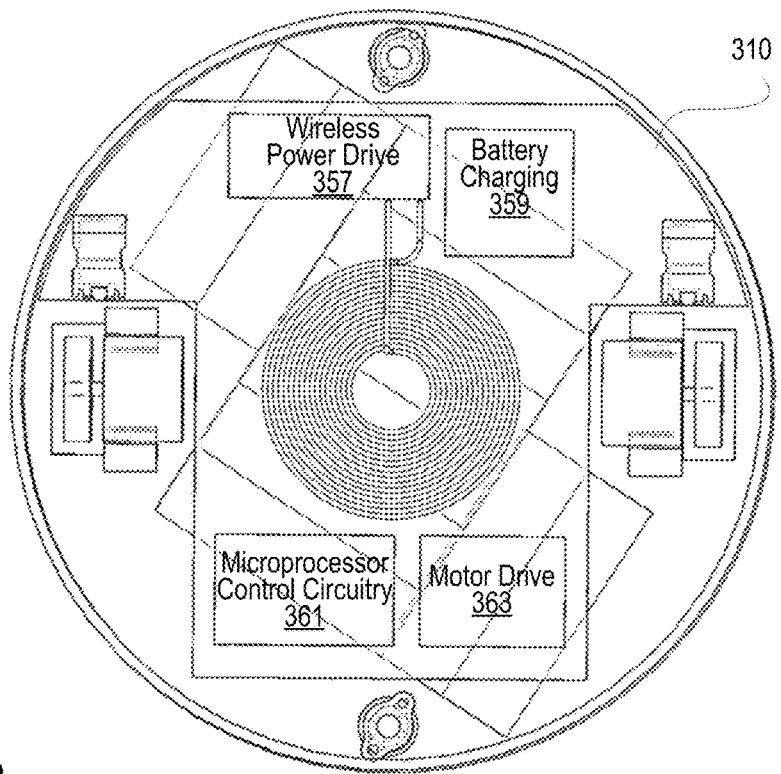
FIG. 8 is a top view of the mobile wireless energy transfer unit of FIG. 7, according to one or more embodiments.

FIGS. 7-8 depict the rover 310 with a top cover removed exposing wireless power drive 357, battery charging component 359, microprocessor control circuitry 361 and motor drive 363.

Figure 9:
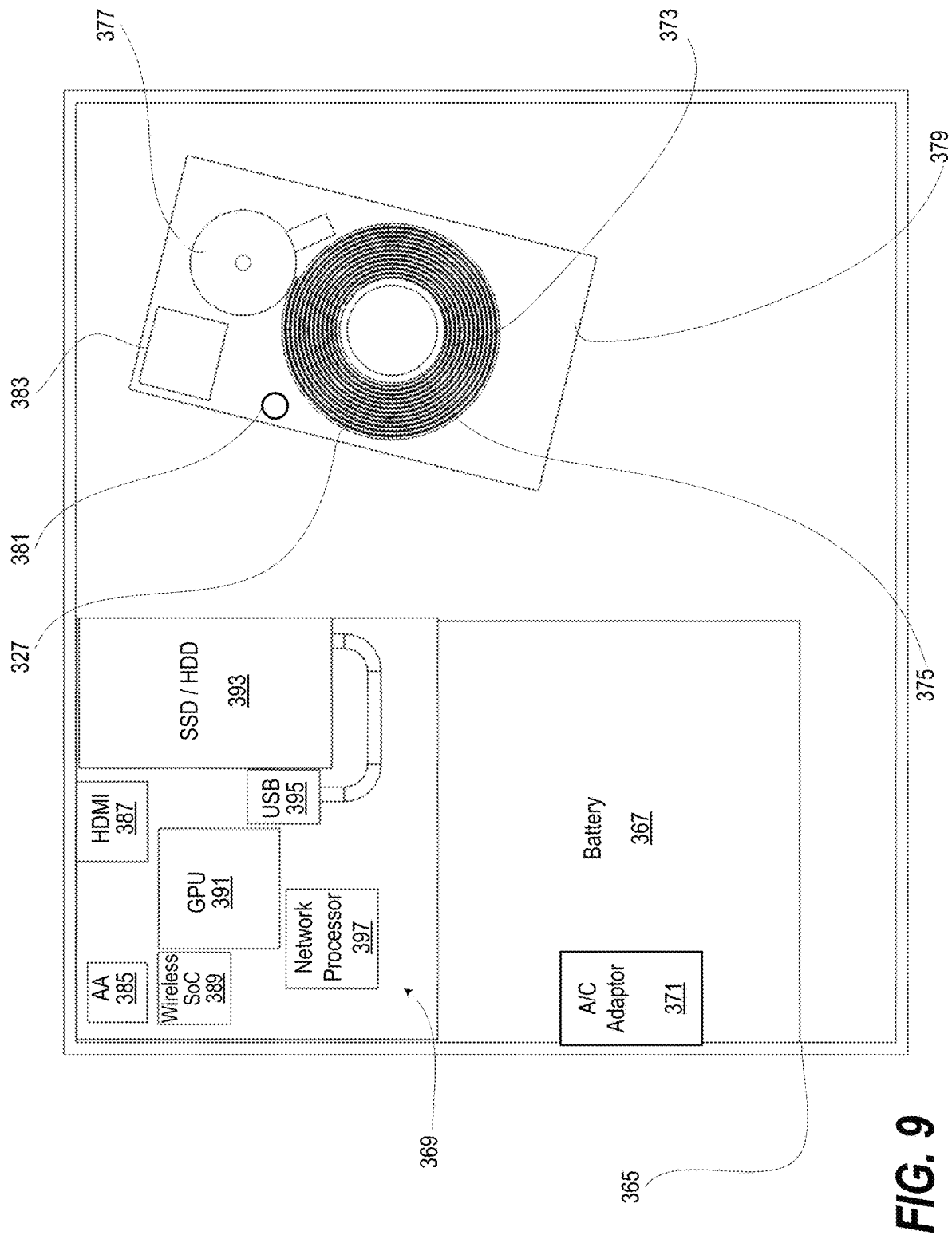
FIG. 9 depicts dock unit includes a battery for providing energy to dock circuitry and also provide energy to the mobile wireless energy transfer unit, according to one or more embodiments.

FIG. 9 depicts dock unit 365 includes a battery 367 for providing energy to dock circuitry 369 and also provide energy to the rover 310 (FIG. 4) through the cable 327. Battery 367 can be continuously charged from AC/DC adapter 371 or the system can be powered from the battery for (for instance) three hours or more. Cable 327 provides a conductive path for establishing a circuit for providing energy to rover 310. Cable 327 winds and unwinds on spool 373 according to torque direction applied by motor 375. The wound portion of cable 327 is kept in place by roller 377. A spooler 379 rotates on pivot 381 due to the moment of the cable tension acting at the point where the cable 327 exits the spool 373. Spooler 379 includes CPU 383 with wireless communication & spool motor drive circuitry. Dock circuitry 369 includes an antenna array 385, HDMI interface 387, wireless system on a chip (SoC) 389, GPU 391, SSD/HDD 393 with USB interface 395, and network processor 397.

With continued reference to FIG. 3, in one or more embodiments, controller 324 can coordinate device space positioning within range tracking (e.g., Bluetooth RSSI, near surface: yaw, pitch, roll). An app is installed on the electrical device 308. This app runs in the background on the device 308. Device 308 contains a Bluetooth transceiver. The docking station 300 includes at least one Bluetooth transceiver 398 and one or more beacon antennae arrays 399a-399b. When this Bluetooth transceiver of electrical device 308 is in range of either blue tooth beacon antennae arrays 399a-399b attached at different locations on the docking station 300, the device 308 pairs with one or both beacon antennae arrays 309a-309b. Then the device 308 begins to send received signal strength indicator (RSSI) results back to the Docking station controller 324. Using this information, the program executed in the Dock CPU determines if the device is likely to be within one (1) meter of any part of the chargeable area. If the program indicates that the device 308 may be within such volumetric space, then the app on the device begins to monitor the accelerometer and magnetometer which are integrated into the device 308. Using this accelerometer and magnetometer, algorithms are used to determine the dead reckoning (yaw, pitch and roll) of the device. If pitch and roll are both near zero (near parallel to the earth surface) then the CPU in the dock will place each of the Bluetooth beacons in angle of departure transmit mode. Alternatively, angle of arrival can be implemented on Bluetooth transceivers which are placed on roll tray and also in rover.

Angle of Departure Precise positioning: In one or more embodiments, the antenna arrays utilized in each beacon are 3×3 rectangular arrays (e.g. 9 antennas in each array). Typically the two antennae arrays (one in dock unit, one in dedicated beacon) will each be mounted parallel to the floor (ground, earth) and at very similar elevations above the floor (ground, earth).

In angle of departure mode, each beacon will transmit on each antenna element in a specific order with a precise phase relationship relative to the wave transmitted on the other antennas. Often the waves on different antennas will be transmitted as near to in-phase as reasonably practicable. The beacon side transmit specifics such as transmit order, any amount of transmit phase relationship, geometry of the antennae array, and position and orientation of each antenna array are known to the positioning app on device 308. Therefore, the phase (timing) of the received signal at the antennae in device 308 can be utilized by the Angle of Departure algorithm executed inside the positioning app running on the device 308. These algorithms are used to determine the azimuth and elevation angles of the device 308, relative to each Bluetooth beacon. By having two beacons and two known azimuth and elevation heading lines, the 3d position of the device 308, relative to the two beacons can be calculated by the app running on the device. The moving charger also has a Bluetooth antenna, and also has processor on board which performs the same positioning routine as the device (described above). In this way the charger can locate directly below the device.

Also the charger 310 can preferentially locate under devices 308 which need to be charged on a "device most in need" basis. For instance the charger can locate under wireless keyboards, wireless mice, wireless monitors, etc. Each of these wireless devices could be located using a angle of departure or angle of arrival method and system like indicated above.

In one or more embodiments, display output of docking station 100 includes display pixel generation. Device includes a CPU which communicates on WLAN via a WSoC. The Graphical User Interface (GUI) provided by the device display, is through a very high degree of co-processing by the Graphics Processing Unit (GPU) in the device. The device GPU, then outputs a frame buffer into memory. This frame buffer is then used to drive the pixels onto the Device Display.

Display Pixel Data Routing (to Dock): In the present system, when the device 308 is placed down on the surface and begins to receive charge from the charger, the frame buffer (generated by the GPU in device, 1) will be routed over the wireless network, from GPU RAM in device 308 to the CPU in device 308 and sent out on the WLAN to receiving WSoC and CPU in the dock 300. The frames are then transferred into the GPU Graphics RAM. From here the GPU uses the frames in Graphics RAM to drive the HDMI output to the User Display which can be a monitor connected to the HDMI port on the Dock.

Compress Pixel Data: Also, rather than sending an uncompressed frame buffer, a the video can be compressed in near real time (<approx. 20 ms) prior to being sent over the wireless link. Then on the receiving end the compressed frames can be decompressed (in near real time, <less than approximately 20 ms) to fill the frame buffer in the Graphics RAM in the Dock. Thus the GPU in the Dock can drive these pixels to the display output. This would be most commonly implemented when the pixel data on the device is from a compressed source (such as video playback). Also, devices which do not support a sufficient WLAN data rate, may utilize compression to move the video over the link at the required frame rate.

Monitor (Wireless Display & Charging): On top the desk surface is a display, which connects to the HDMI output of the docking station 300. This display, also includes a receiving loop. In much the same manner as in charge transfer to the device 308, electrical energy coupled into receiving loop is converted by receiver/charger circuitry for charging battery in the monitor. Alternatively, the display can contain a WSoC, Network Processor, and GPU. In this way the Network processor in the Display can receive pixel data for each frame at 30 or more frames per second. Keep in mind that the WSoC, Network Processor and GPU could be integrated into the Monitor such that the monitor could be fully wireless by being charged from the wireless charger.

Keyboard and Mouse (Wireless I/O, and Charging): Also on top the desk can be a wireless keyboard and wireless mouse. Both of these devices can be charged by the charger.

Device 308 can offload process modules to docking station 300. GPU processing on device to support the user display can become energy intensive. The CPU and GPU located in the docking station 300 can also be used to offload process modules from the device 308, CPU and GPU. For instance, display user interface, process modules running (co-processing) on the Device 308 CPU and GPU can be offloaded to the CPU and GPU on the docking station 300. These process modules could include operations such as graphics draw calls, video decoding, image rendering and editing. Other energy intensive processes can also be offloaded from the device 308. CPU intensive process modules such as, HTML, CSS and JavaScript processing and pdf parse, scripts and audio could be offloaded to the CPU in the docking station 300.

Internet: Using the WSoC transceiver, the network processor in the docking station 300 establishes a WLAN connection to external networks such as a WAN (Wide Area Network) such as the Internet. With this WAN connection the device 308 can transact Internet (and other) data traffic via its connection to WLAN.

Storage (and Data Set): The docking station 300 also includes a large nonvolatile storage device which provide bulk data storage which can be accessed by the device 308 via the WLAN. In this way vast sums of data can be accessible and secure.

AI/ML Assistant: Being that the dock unit, x can be managed to secure a sizable data set (for instance: scholarly encyclopedias, categorized actionable research) an AI personal assistant could be trained and produce results for the user of the device 308.

Figure 10:
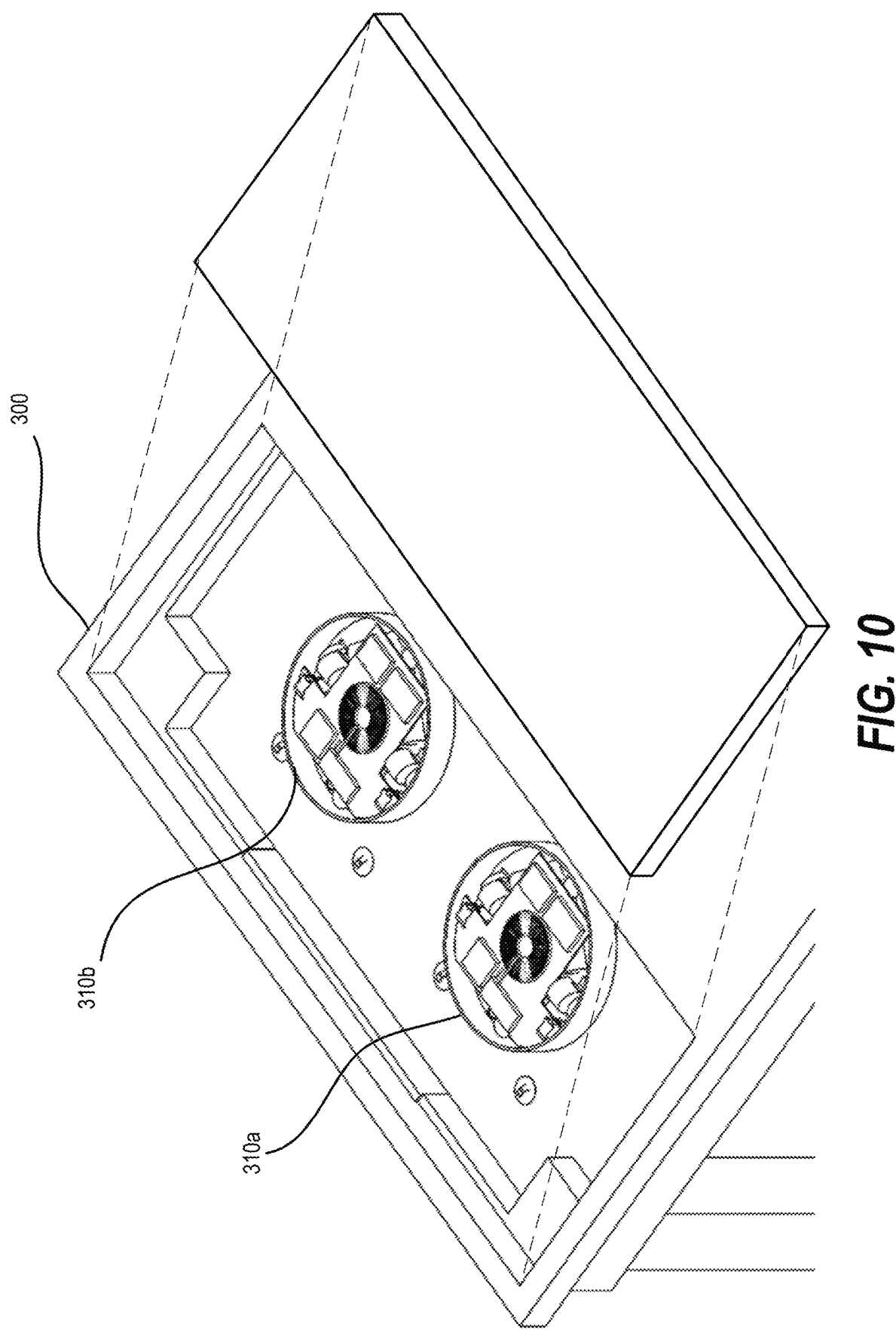
FIG. 10 is a top isometric view of the docking system including two mobile wireless energy transfer units, according to one or more embodiments.

FIG. 10 illustrates the docking system 300 including two rovers 310*a*, 310*b* received for movement on the charging tray 302. In one or more embodiments, the controller 324 (FIG. 3) controls the two rovers 310*a*, 310*b* to charge different wireless electronic devices (not shown). In one or more embodiments, each rovers 310*a*, 310*b* has a particular assigned area and is independently controlled to recharge a wireless electronic device placed in that area.

Figure 11:
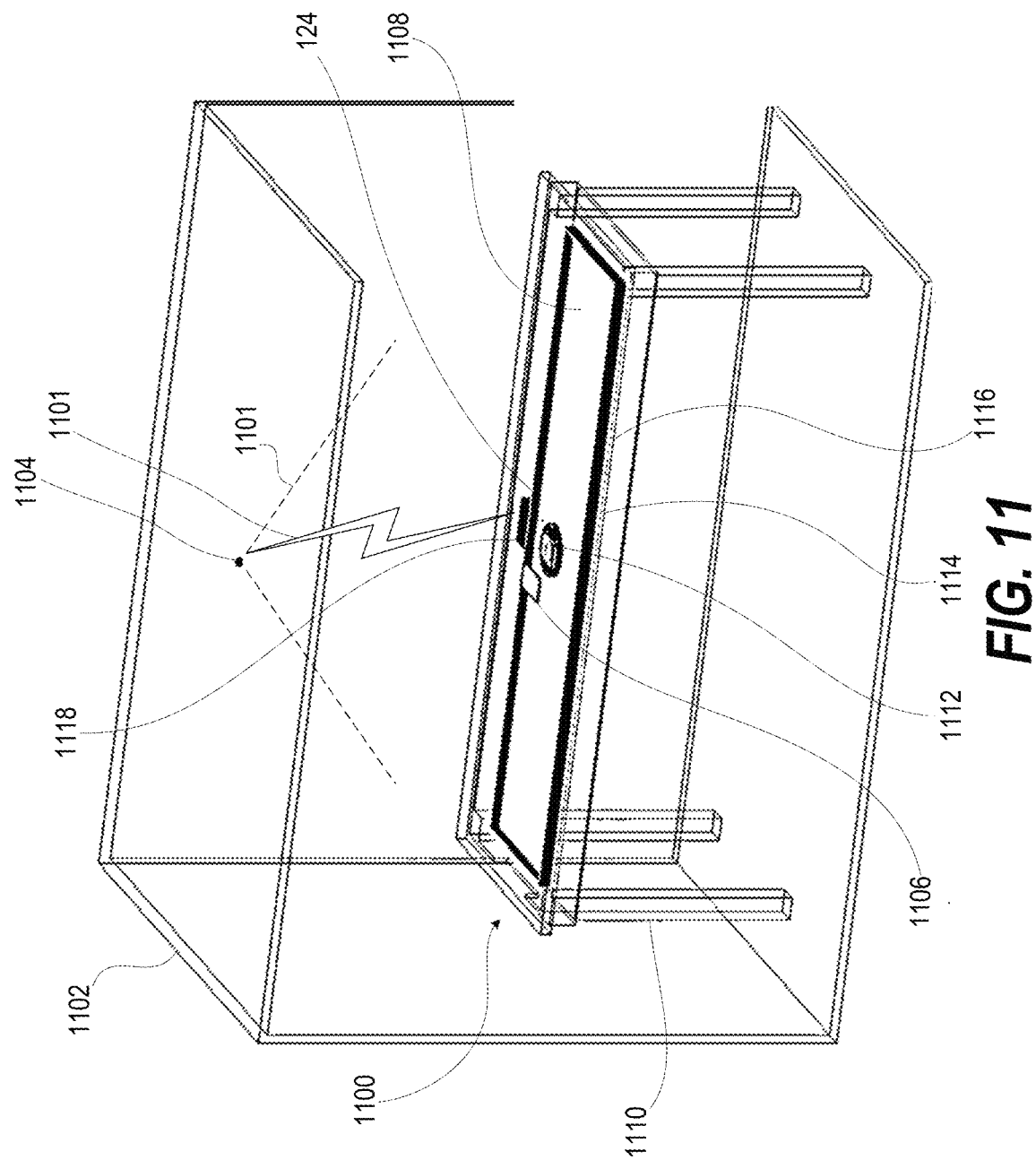
FIG. 11 is a three-dimensional view of a docking system positioned within a room having a camera mounted to view a charge receiving device placed on a charging surface of a table, according to one or more embodiments.

FIG. 11 is a three-dimensional view of a docking system 1100 positioned within a room 1102 having a camera 1104 mounted to view a charge receiving device 1106 placed on a charging surface 1108 of a table 1110. A controller 124 is communicatively coupled to the camera 1104. (FIG. 1 The controller 124 performs object recognition to recognize that charge receiving device 1106 is shaped like devices that can receive wireless charging. The controller 124 identifies a location of the charge receiving device 1106 on the charging surface 1108. The controller 124 directs mobile wireless energy transfer unit ("rover") 1112 to the location on the charging surface 1108. The rover 1112 moves on a rover surface 1114 of the dock system 1100 to confirm the location of the charge receiving device 1106 and to provide electrical power transfer. The controller 124 can include centralized or distributed processors that are included in one or more of the camera 1104, the rover 110, and a printed circuit assembly (PCA) 1118 that is mounted to the charge tray 1116 attached underneath the table 1110 to support the rover 1112.

Figure 12:
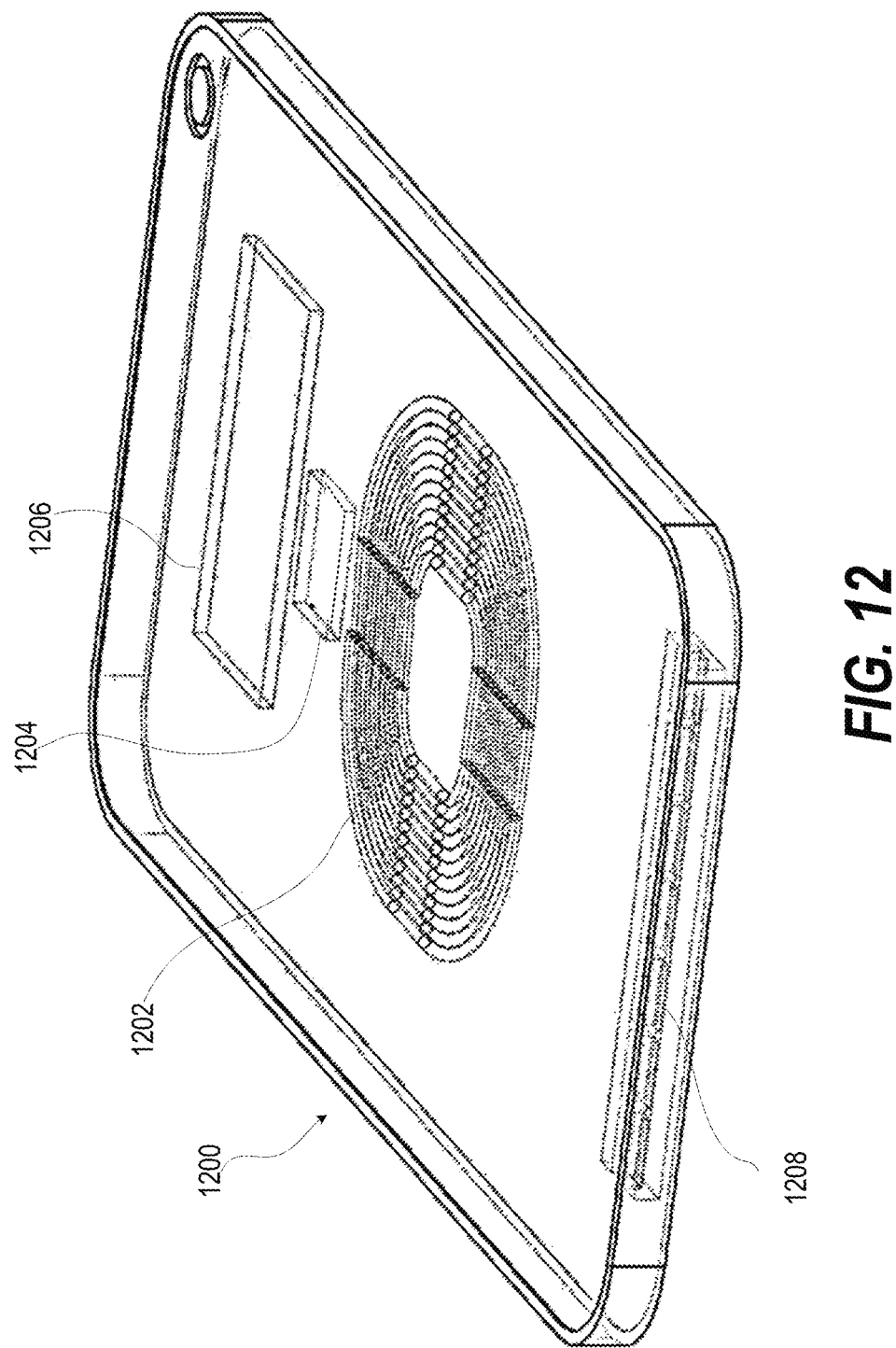
FIG. 12 is a three-dimensional top view of example charge receiving device having a receiving inductive coil that provides received power to receive charge regulating circuitry that in turn manages charge delivery to a battery, according to one or more embodiments.

FIG. 12 is a three-dimensional top view of example charge receiving device 1200 having a receiving inductive coil 1202 that provides received power to receive charge regulating circuitry 1204 that in turn manages charge delivery to a battery 1206. To assist in locating charge receiving device 1200 for inductive charging, one or more permanent magnets 1208 are attached to a case or cover 1210 of the charge receiving device 1200.

FIG. 13 is a top view and FIG. 14 is a top detail view of an example docking system 1300 having a charging tray 1302. With particular reference to FIG. 14, an AC/DC adapter 1304 provides DC power a PCA 1305 that is communicatively coupled via an interface bus 1307 to first, second and third sensor strips 1309a-1309c. The sensor strips 1309a-1309c are longitudinally aligned and equally spaced across an undersurface of the charging tray 1302. Magnetic sensors 1311 are spaced along each sensor strips 1309a-1309c to form a grid pattern. A mobile wireless energy transfer unit ("rover") 1313 includes left and right electromagnets 1315a-1315b that can be activated for detection by magnetic sensors 1311. With electromagnets 1315a-1315b off, magnetic sensors 1311 can detect permanent magnets 1208 that are attached to the charge receiving device 1200 (FIG. 12).

Figure 15:
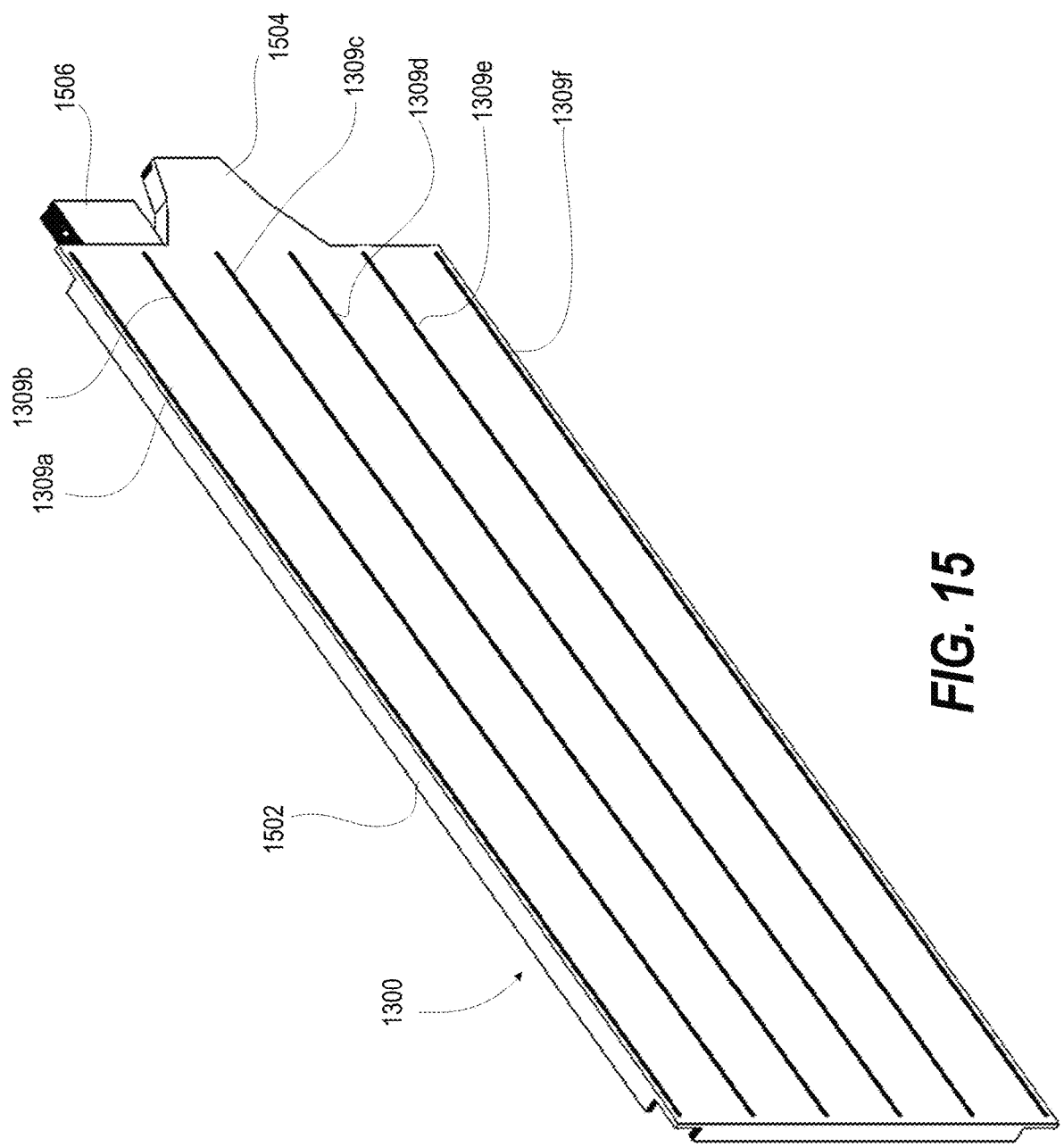
FIG. 15 is a three-dimensional bottom view of an example docking system of FIG. 13 having a charging tray that is generally rectangular but has a parking nook, according to one or more embodiments.
Figure 16:
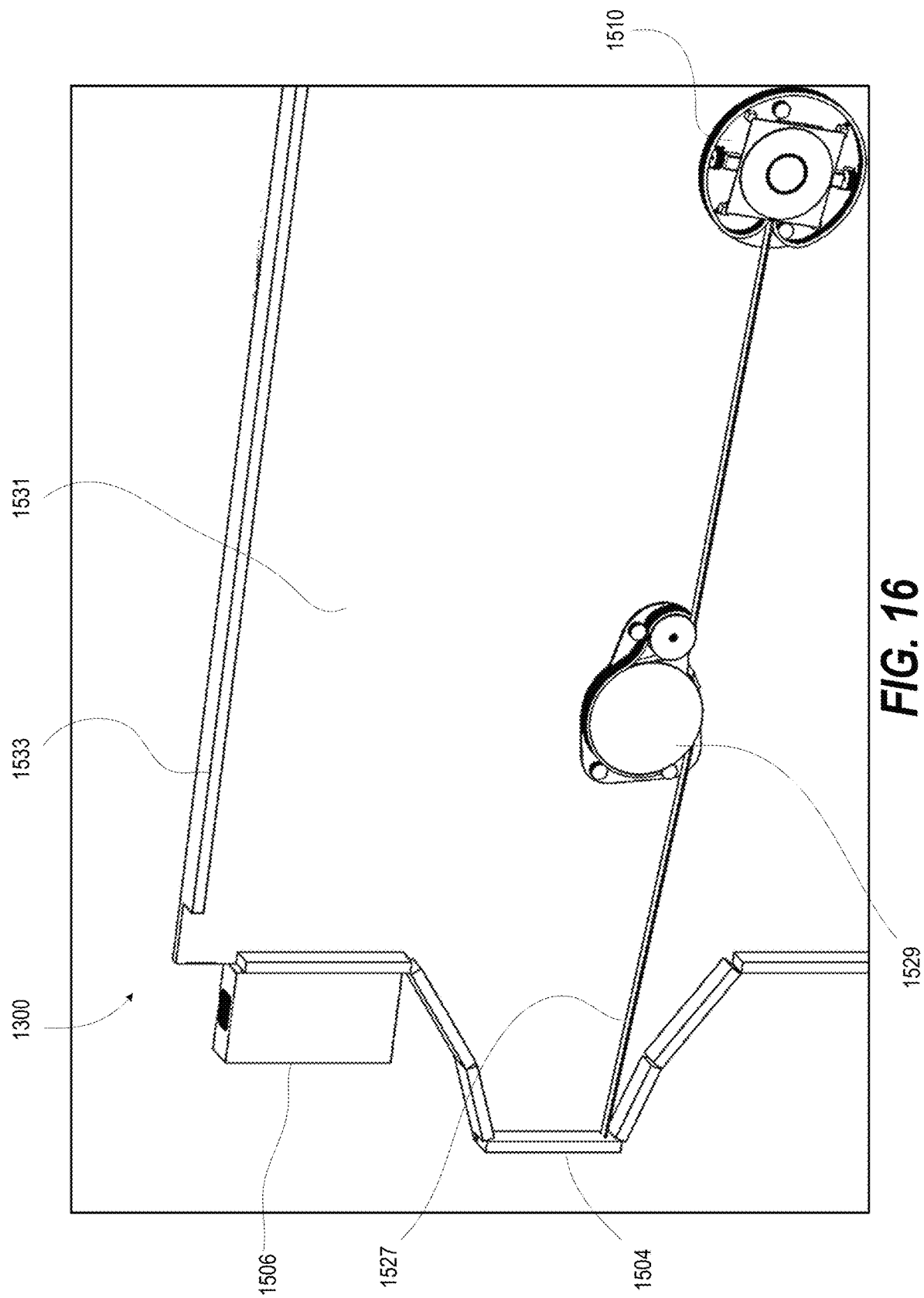
FIG. 16 is a top three-dimensional view of the example docking system of FIG. 13, according to one or more embodiments.
Figure 17A:
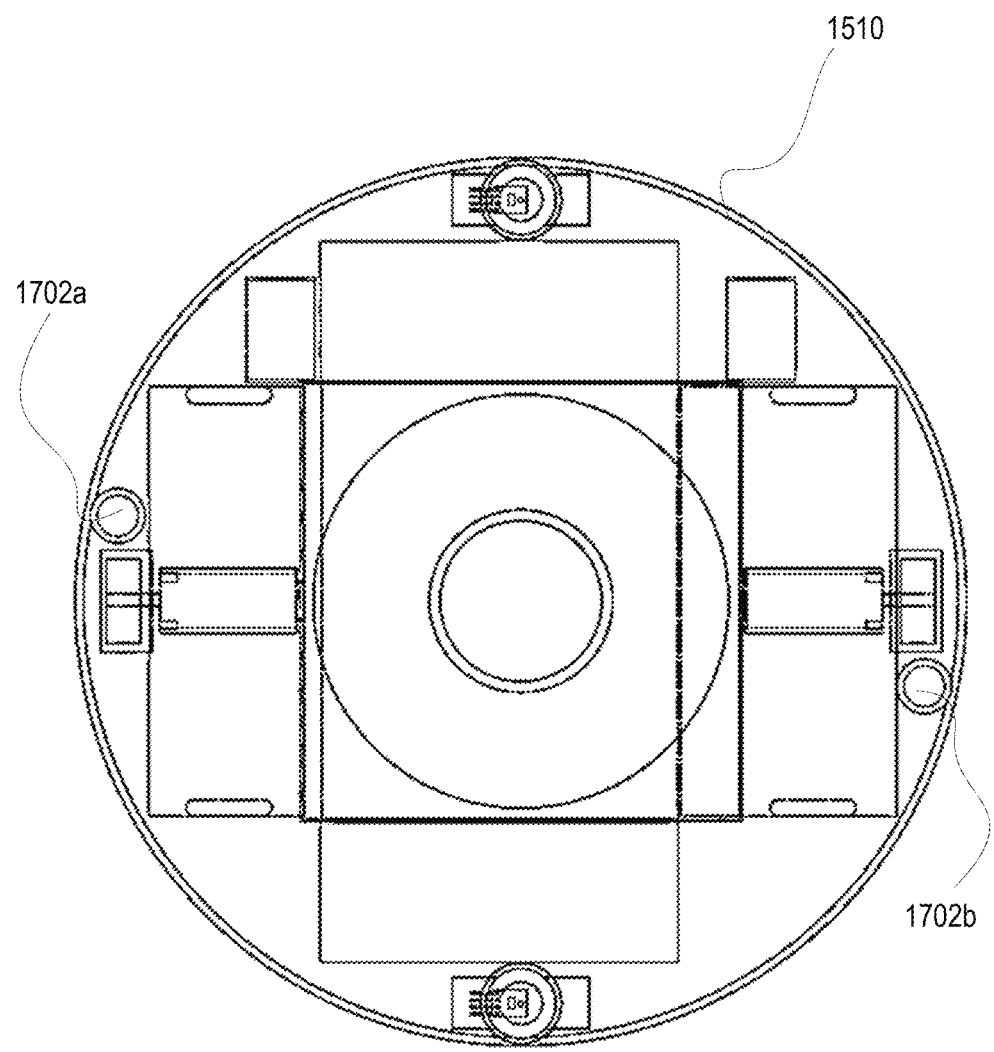
FIG. 17A is a top view of a rover of the example docking system of FIG. 13 that has left and right electromagnets, according to one or more embodiments.
Figure 17B:
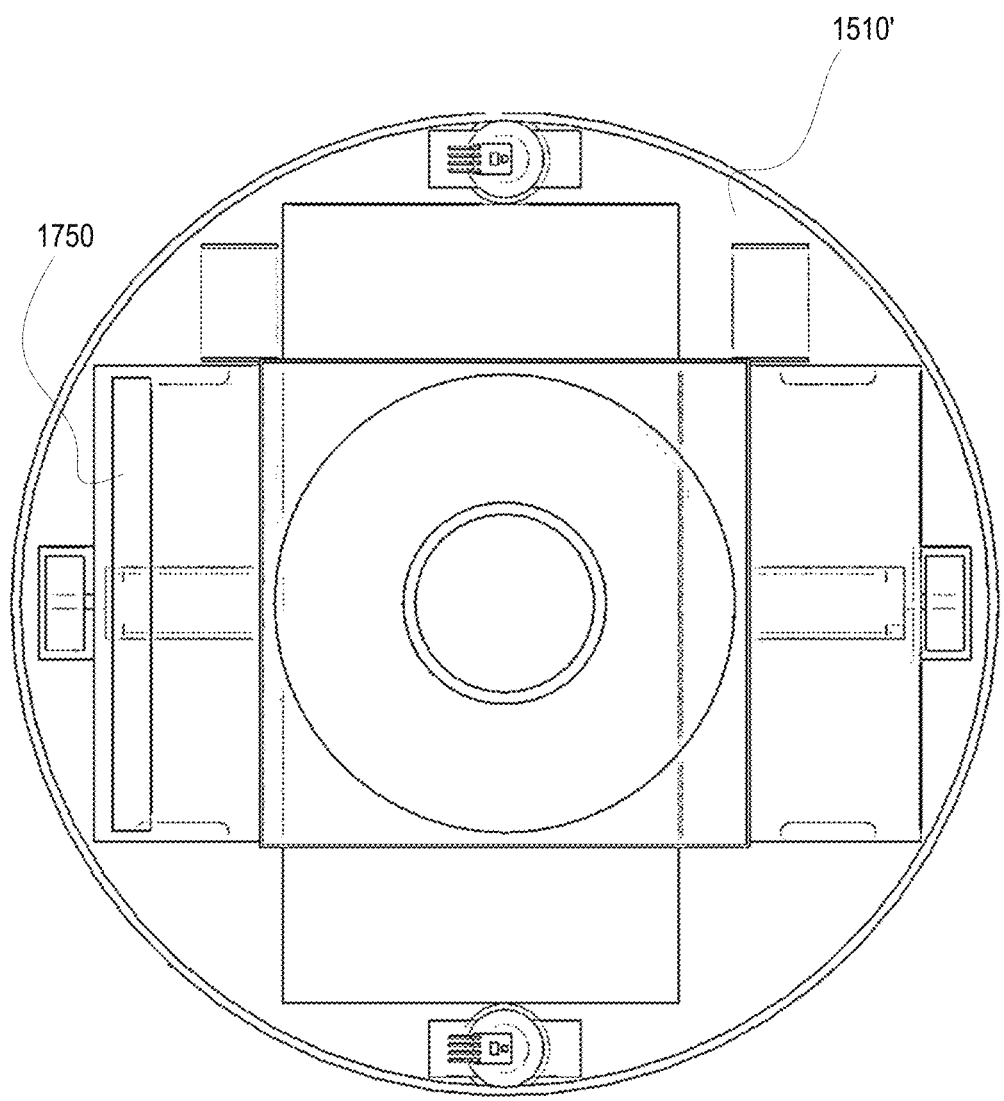
FIG. 17B is a top view of a rover of the example docking system of FIG. 13 that has left permanent bar magnet, according to one or more embodiments.

In one or more embodiments, FIG. 15 is a three-dimensional bottom view of an example docking system 1300 having a charging tray 1502 that is generally rectangular but has a parking nook 1504 next to PCA 1506. Charging tray 1502 includes sensor strips 1309a-1309f. FIG. 16 is a top three-dimensional view of the example docking system 1300. A mobile wireless energy transfer unit ("rover") 1510 is tethered by a multi-conductor cable 1527 for receiving electrical power and communication. A cable spooling device 1529 prevents slack and entanglement of the cable 1527. The cable spooling device 1529 can be a passive spring-biased device or an active device similar to spool 373 (FIG. 3). Rover 1510 moves on a (top) rover surface 1531 of charging tray 1302. Upturned lateral edges 1533 of charging tray 1302 engage an undersurface of a table 106 (FIG. 1), defining a volume vertically sized to closely fit rover 1510 and cable spooling device 1529. PCA 1506 laterally extends from a particular upturned lateral edge 1533 beside the parking nook 1504. Cable spooling device 1329 is received in parking nook 1504 when the cable 1527 is fully retracted, enabling the rover 1510 to fully traverse a rectangular portion of the rover surface 1531. In one or more embodiments, FIG. 17A depicts a top view of the rover 1510 that has left and right electromagnets 1702a-1702b. In an alternate embodiment, FIG. 17B depicts a rover 1510' having a permanent bar magnet 1750 or a bar electromagnet along a left side with one of the north and south poles directed in a forward direction. The permanent bar magnet 1750 can be detected by the docking system 1300 (FIG. 13).

Figure 18:
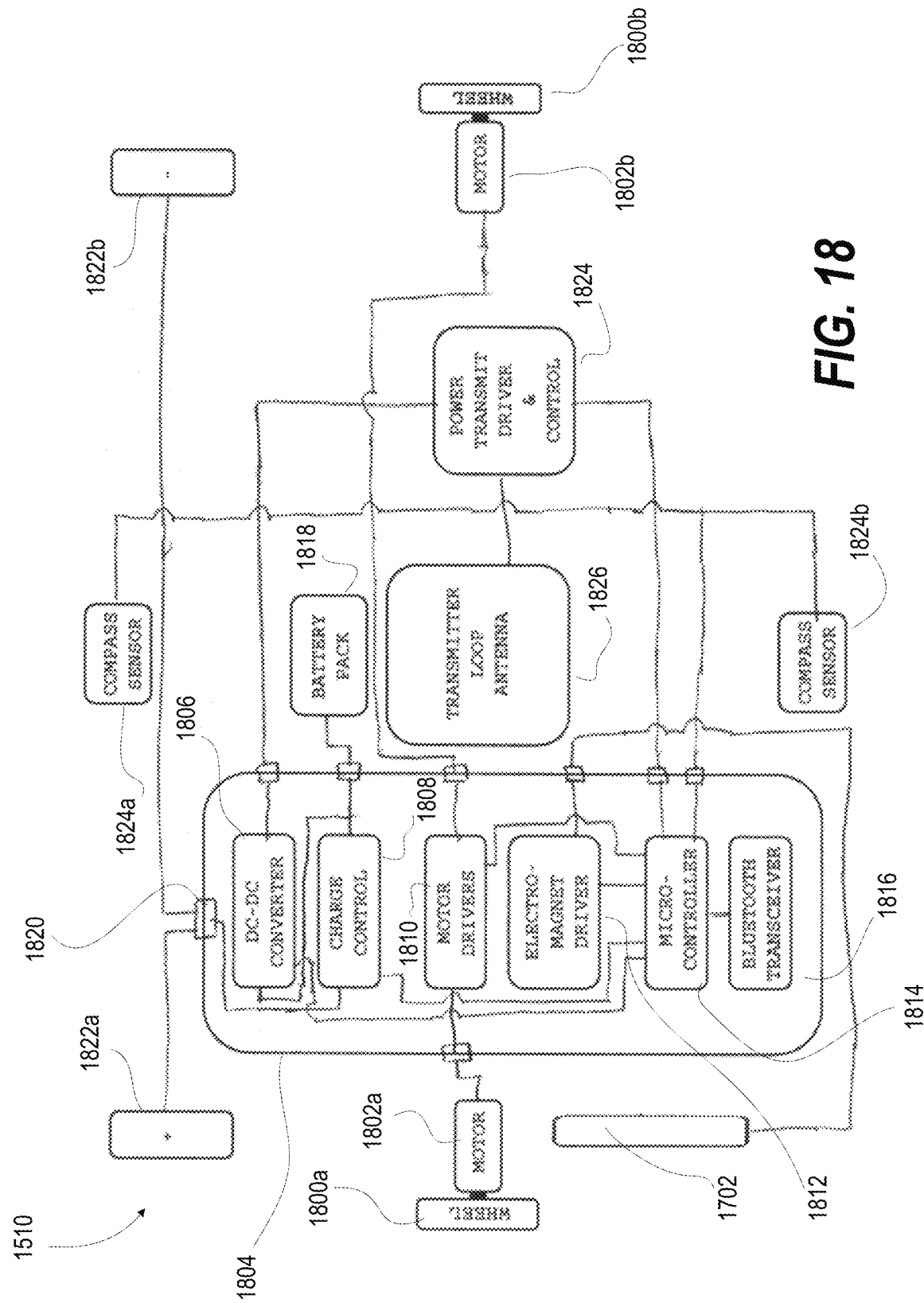
FIG. 18 is a functional block diagram of the rover of the example docking system of FIG. 13, according to one or more embodiments.

FIG. 18 is a functional block diagram of the rover 1313. Left wheel 1800a is driven by left motor 1802a. Right wheel 1800b is driven by right motor 1802b. An onboard PCA 1804 includes DC-DC converter 1806 and charge control 1808. The onboard PCA 1804 includes motor drivers 1810 that generates differential drive signals for motors 1802a-1802b. Rover 1510 can perform a zero-turn radius. The onboard PCA 1804 includes an electromagnetic driver 1812 that activates right and left electromagnets 1702a-1702b. The onboard PCA 1804 includes a microcontroller 1814 that manages the other components of the onboard PCA 1804 including a Bluetooth transceiver 1816 that can be used to locate and communicate with the charge receiving device 1200 (FIG. 12). In one or more embodiments, battery pack 1818 provides power for rover 1510 that can operate autonomously rather than with tethered power. In one or more embodiments, the rover 1510 can dock itself to a power port that provides a positive terminal 1822a and negative terminal 1822b of a supplied power to recharge battery pack 1818. Microcontroller 1814 can operate as the controller 124 (FIG. 13) to manage power transmit driver and control circuitry 1824 that transfers power via transmitter loop antenna 1826 to the charge receiving device 1200 (FIG. 12). The charge control 1808 draws power from the battery pack 1818 and regulates the power via DC-DC converter 1806 for the power transmit driver and control circuitry 1824. In one or more embodiments, microcontroller 1814 (FIG. 13) monitors front and back compass sensors 1828a-1828b that detect permanent magnets 1208 that are attached to the charge receiving device 1200 (FIG. 12). In one or more embodiments, the rover 1510 has approximately a 0.625 inch.

Figure 19:
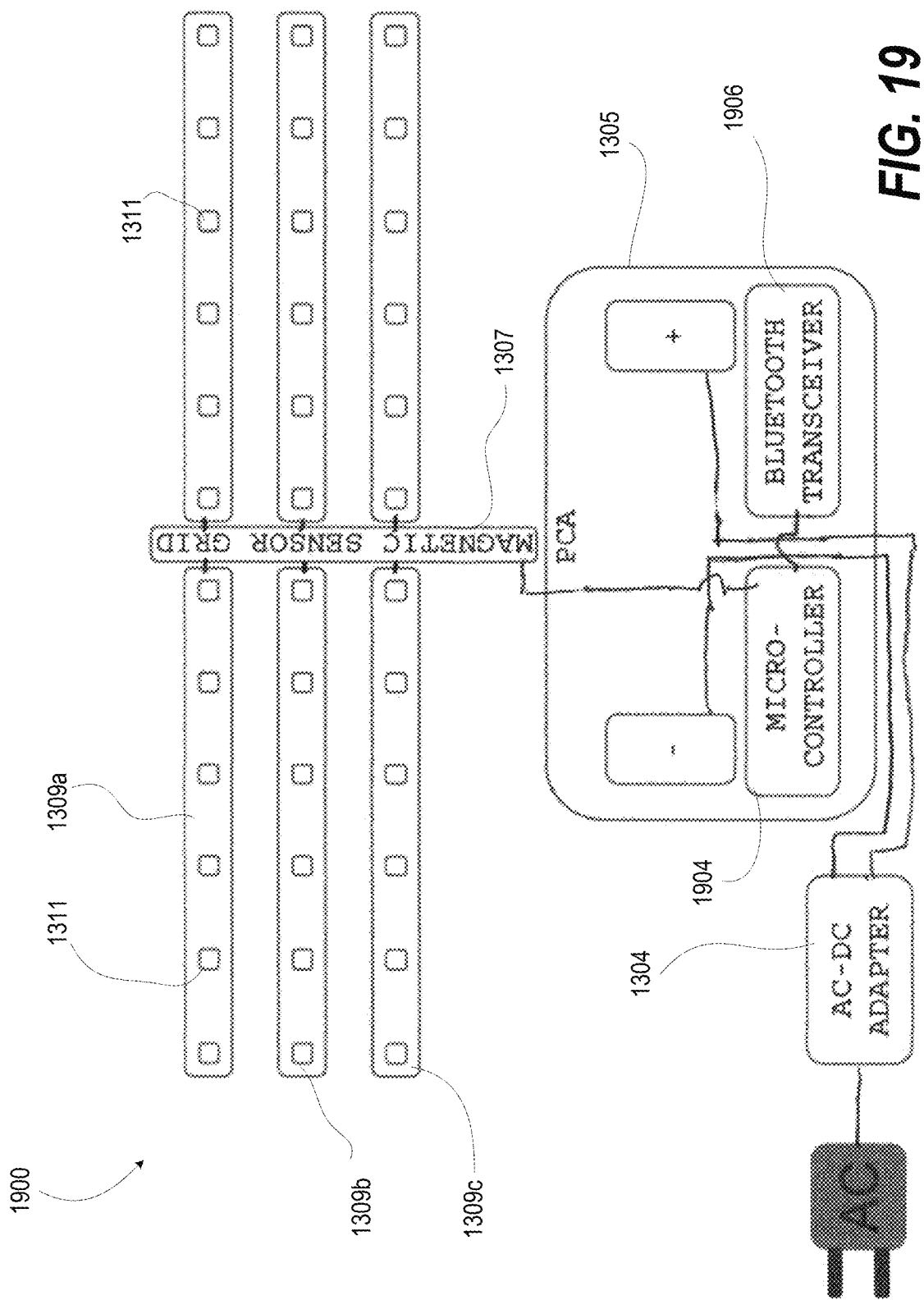
FIG. 19 a functional block diagram of a table mounted magnetic sensing system of the docking system of FIG. 13, according to one or more embodiments.

FIG. 19 depicts a functional block diagram of a table mounted magnetic sensing system 1900 of the docking system 1300 (FIG. 13). AC/DC adapter 1304 receives AC power from supply source and provides DC power to a PCA 1305 that is communicatively coupled via the interface bus 1307 to first, second and third sensor strips 1309a-1309c. Magnetic sensors 1311 are spaced along each sensor strips 1309a-1309c to form a grid pattern. A microcontroller 1904 monitors magnetic readings made by magnetic sensors 1311 and provides raw data or location data based on the raw data to the rover 1313 (FIG. 14) via a Bluetooth transceiver 1906.

Figure 20:
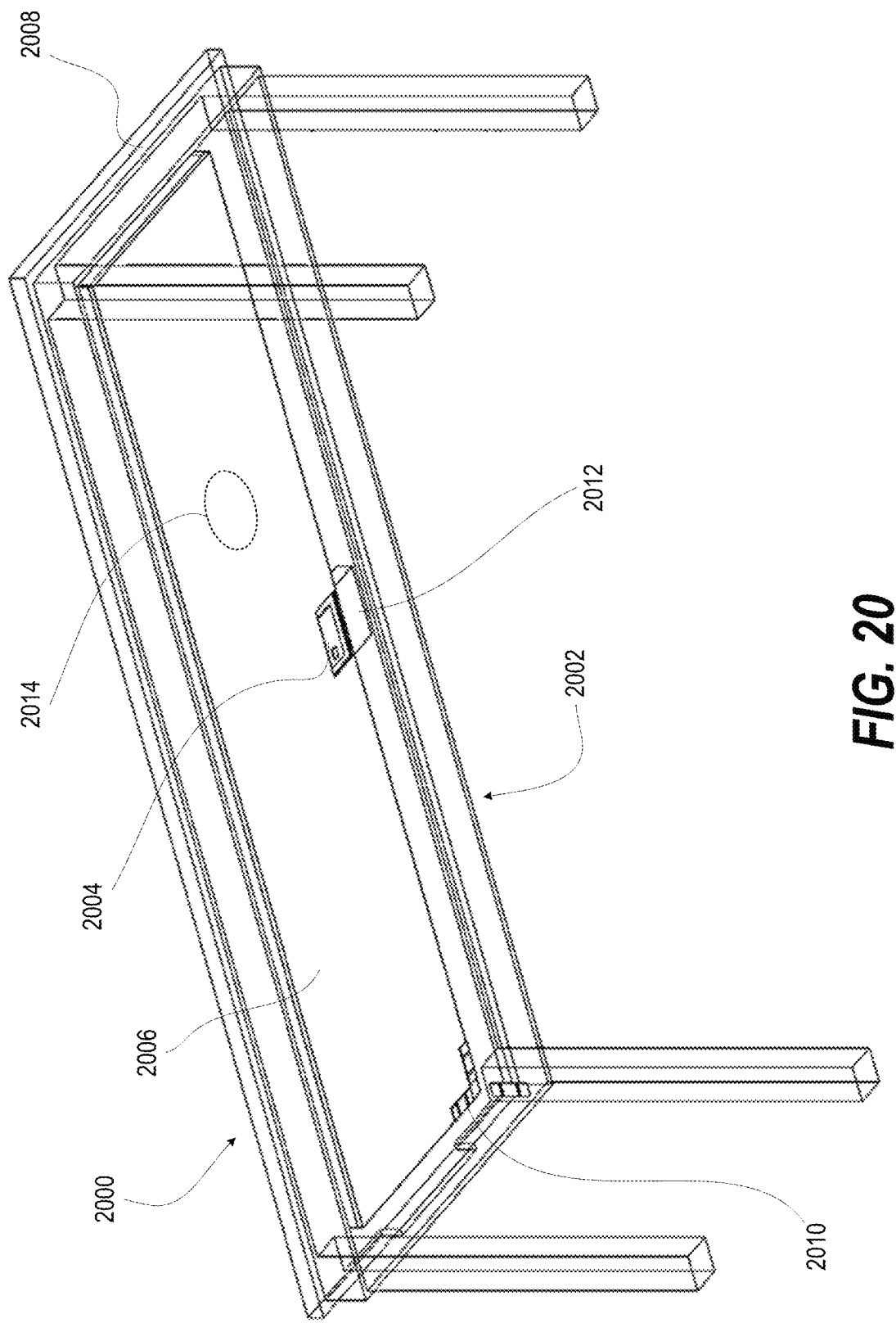
FIG. 20 is a three-dimensional view of an example docking system having an angle of arrival (AOA) locating system, according to one or more embodiments.

FIG. 20 is a top three-dimensional view an example docking system 2000 having an angle of arrival (AOA) locating system 2002 that locates a charge receiving device 2004 on a charging surface 2006 of a table 2008. In one or more embodiments, the AOA locating system 2002 uses an antenna array 2010 mounted in a corner of the table 2008 to measure three orthogonal X, Y, Z components of a transmission from the charge receiving device 2004. The transmission can be a personal access network (PAN) transmission such as for Bluetooth communication. The transmission can be a cellular uplink signal. The AOA locating system 2002 uses the timing of the received RF wave to calculate the three-dimensional location of the charge receiving device 2004 relative to a PCA 2012 fixed below the charging surface 2006 and also relative to a rover 2014. The AOA locating system 2002 is provisioned with relative three-dimensional coordinates of the charging surface 2006 that are compared with the location of the charge receiving device. A charge receiving device 2004 that is not on the charging surface 2006 is not reported to the PCA or rover 2014.

Figure 21:
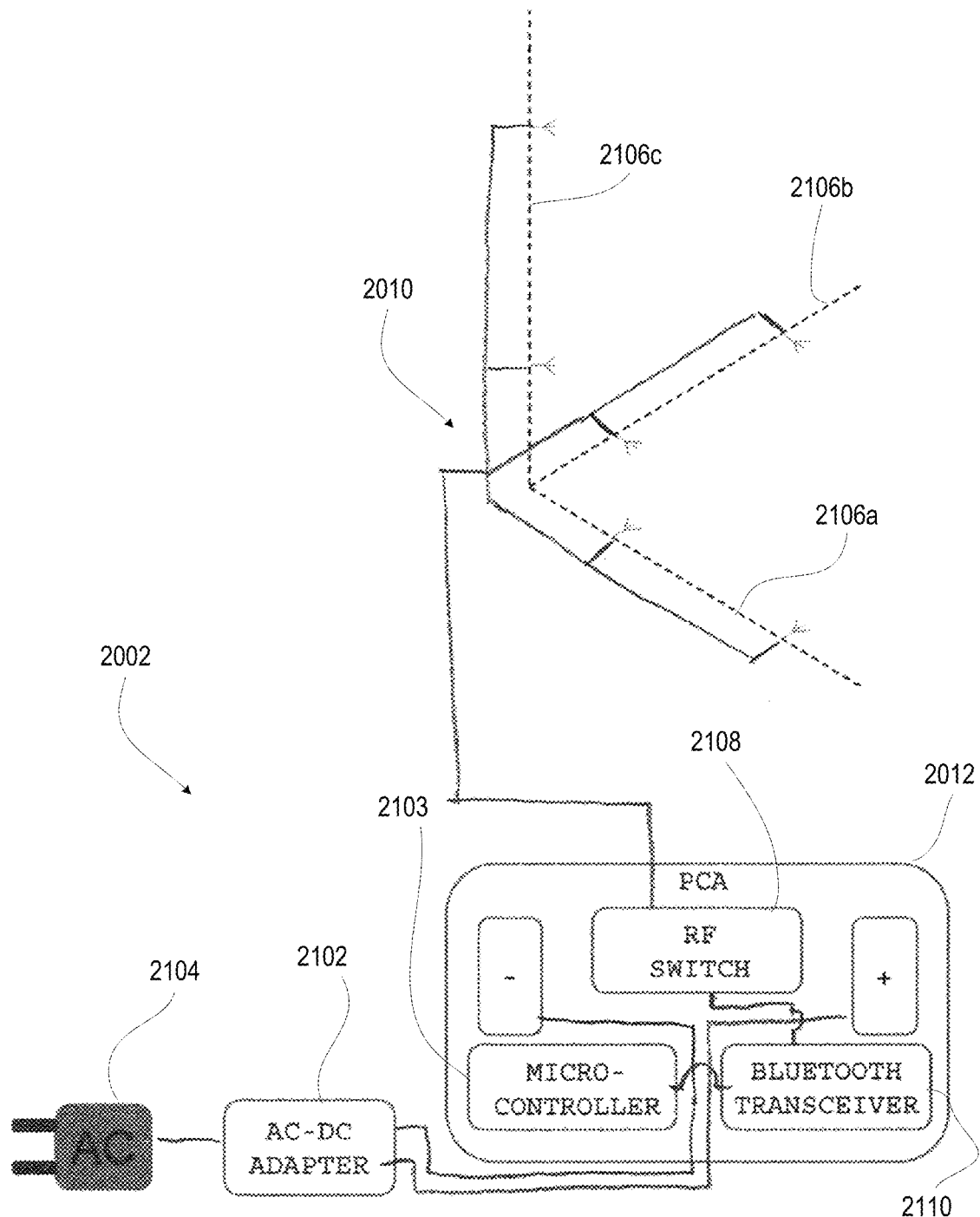
FIG. 21 is a functional block diagram of the AOA locating system of FIG. 20, according to one or more embodiments.

FIG. 21 is a functional block diagram of the AOA locating system 2002 of the docking system 2000 (FIG. 20). AC/DC adapter 2102 receives AC power from supply source 2104 and provides DC power to the PCA 2012. A microcontroller 2103 monitors received RF signals received by each orthogonal antenna element 2106a-2106c the antenna array 2010. In one or more embodiments, the microcontroller 2103 selects each antenna element 2106a-2106c individually using an RF switch 2108. The microcontroller 2103 provides raw data or location data based on the raw data to the rover 2014 (FIG. 20) via a Bluetooth transceiver 2110.

Figure 22:
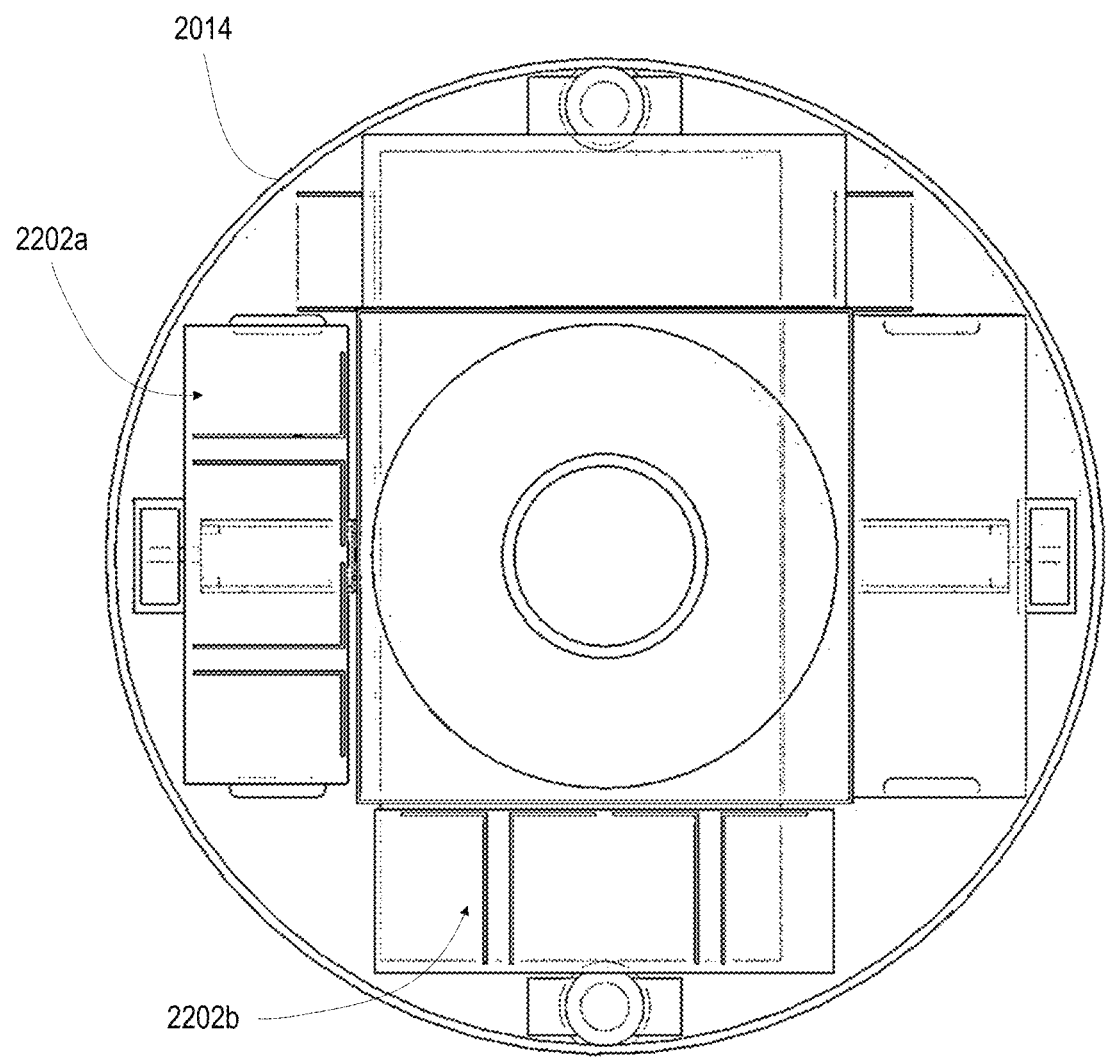
FIG. 22 is a top view of a rover of the example docking system of FIG. 20, according to one or more embodiments.

FIG. 22 is a top view of the rover 2014 that has a left-facing antenna array 2202a and a rear-facing antenna array 2202b. The rover 2000 can use the antenna arrays 2202a-2202b to perform a stationary or moving triangulation to a charge receiving device 2004 (FIG. 20).

Figure 23:
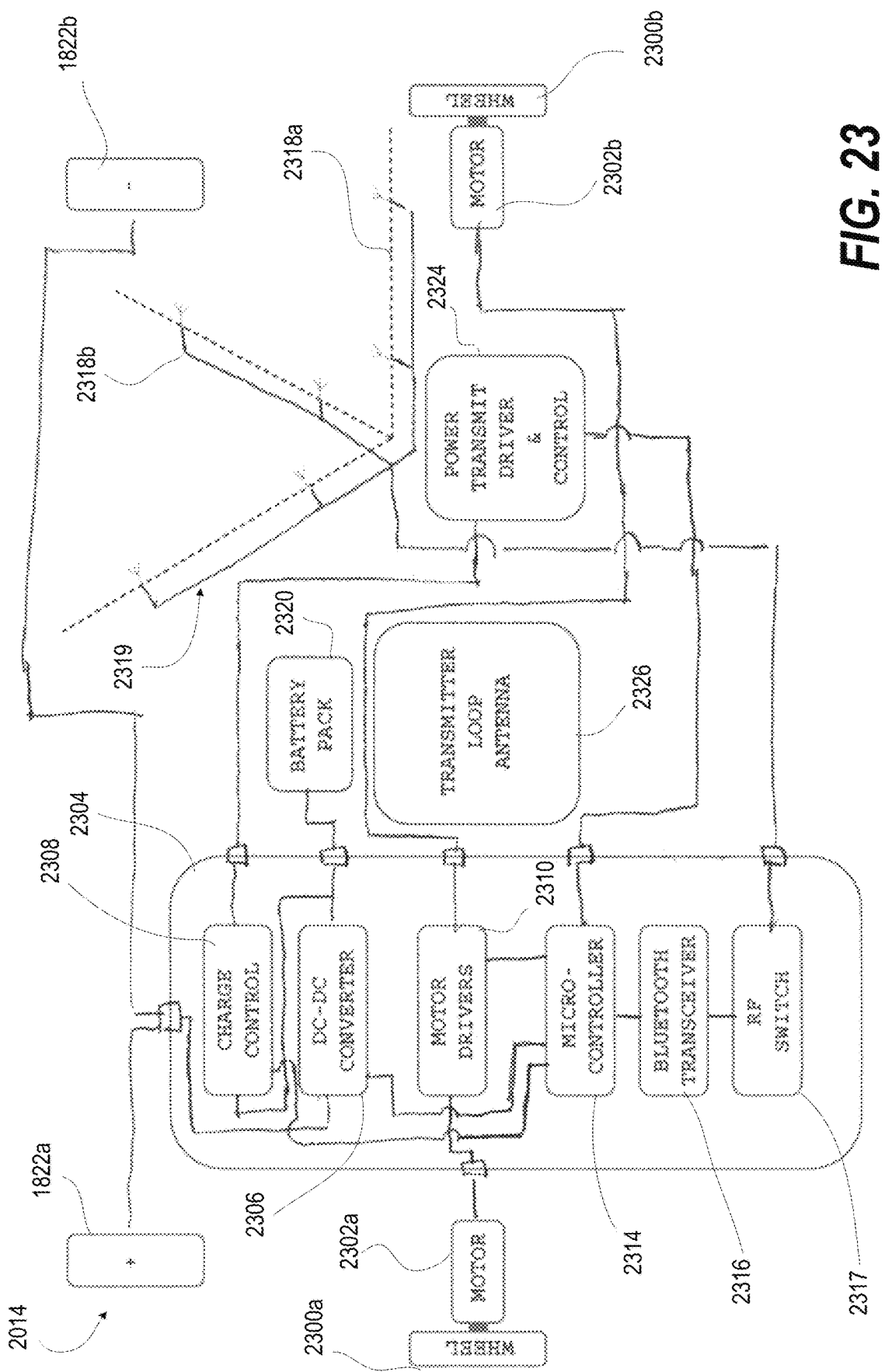
FIG. 23 is a functional block diagram of the rover of FIG. 22, according to one or more embodiments.

FIG. 23 is a functional block diagram of the rover 2014. Left wheel 2300a is driven by left motor 2302a. Right wheel 2300*b* is driven by right motor 2302*b*. An onboard PCA 2304 includes DC-DC converter 2306 and charge control 2308. The onboard PCA 2304 includes motor drivers 2310 that generates differential drive signals for motors 2302*a*-2302*b*. Rover 2014 can perform a zero-turn radius. The onboard PCA 2304 includes a microcontroller 2314 that manages the other components of the onboard PCA 2304 including a Bluetooth transceiver 2316. The microcontroller 2314 sequentially selects, via RF switch 2317, orthogonal antenna elements 2318*a*-2318*b* of an antenna array 2319. The Bluetooth transceiver 2316 receives and measures the RF signals. The microcontroller 2314 determines the relative three-dimensional location of the source of the RF signals to locate the charge receiving device (FIG. 20). In one or more embodiments, battery pack 2320 provides power for rover 2014 that can operate autonomously rather than with tethered power. In one or more embodiments, the rover 2014 can dock itself to a power port that provides a positive terminal 1822*a* and negative terminal 1822*b* of a supplied power to recharge battery pack 2320. Microcontroller 2314 can operate as the controller 124 (FIG. 1) to manage power transmit driver and control circuitry 2324 that transfers power via transmitter loop antenna 2326 to the charge receiving device 2004 (FIG. 20). The charge control 2308 draws power from the battery pack 2320 and regulates the power via DC-DC converter 2306 for the power transmit driver and control circuitry 2324.

In one or more embodiments, the docking system 100 (FIG. 1) can use micropower impulse radar (MIR) to image the charging surface to identify a charge receiving device. For example, a known image of an empty charging surface can be compared to a current image to identify an addition or a removal of a potential charge receiving device. In one or more embodiments, the docking system 100 (FIG. 1) can rely wholly on a rover to locate a charge receiving device. For example, the rover could periodically perform a search pattern using the coupling of the inductive field with any charge receiving device for location. In one or more embodiments, the rover could perform either a stationary or a moving triangulation to locate a charge receiving device that is emitting RF energy. In one or more embodiments, the rover detects magnetometer information when underneath the charge receiving device. The rover performs a search pattern until detecting the charge receiving device. In one or more embodiments, the search pattern by the rover uses a hot/cold procedure to locate the charge receiving device. In one or more embodiments, the rover includes a microphone or accelerometer. In response to be awoken by a sound or vibration, the rover performs a search pattern for a charge receiving device. For example, a user can tap on the table or can make a sound when placing the charge receiving device on the table. The rover can make an audible sound to acknowledge beginning of a search and make a different audible sound when the charge receiving device is located.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A docking station comprising:
   a charging tray mountable to an underside of a surface that is formed of an electromagnetic transmissive material;
   a mobile wireless energy transfer unit that is smaller than the surface and that is received for movement on the charging tray;
   a detection system that detects a position on the surface of an electrical device that is rechargeable by the mobile wireless energy transfer unit;
   an alignment system that positions the mobile wireless energy transfer unit on the charging tray; and
   a controller communicatively coupled to the mobile wireless energy transfer unit, the detection system, and the alignment system and that executes a docking application that enables the docking station to:
      determine, based on an input signal received from the detection system, the position of the electrical device;
      control the alignment system to position the mobile wireless energy transfer unit beneath the electrical device; and
      activate the mobile wireless energy transfer unit to wirelessly charge the electrical device, and wherein:
      the detection system comprises first and second radio frequency (RF) beacons coupled to spaced apart positions on a selected one of the surface and the charging tray;
      the electrical device determines a device position on the surface based on received transmissions from the first and second RF beacons and communicates the device position to the controller;
      the controller determines an energy transfer unit position on the charging tray based on received transmissions from the first and second RF beacons and communicates the energy transfer unit position to the controller; and
      the controller controls the alignment system to position the mobile wireless energy transfer unit beneath the electrical device based on the device and energy transfer unit positions.

2. The docking station of claim 1, wherein the alignment system comprises a motorized wheel drive system that supports the mobile wireless energy transfer unit.

3. The docking station of claim 2, further comprising a second mobile wireless energy transfer unit received for movement on the charging tray and supported by a second motorized wheel drive system, wherein:
the controller enables the docking station to:
determine, based on an input signal received from the detection system, a second position of a second electrical device on the surface;
control the alignment system to position the second mobile wireless energy transfer unit beneath the second electrical device; and
activate the second mobile wireless energy transfer unit to wirelessly charge the second electrical device.

4. The docking station of claim 1, wherein the alignment system comprises a gantry positioning system having a lateral positioning mechanism and a longitudinal positioning mechanism.

5. The docking station of claim 1, further comprising a wireless transceiver that communicates with the electrical device and a second electrical device at a second device position on the surface, wherein the controller determines a selected device of the electrical device and the second electrical device having a selected one of: (i) a lower state of charge; and (ii) a higher usage demand; and controls the alignment system to position the mobile wireless energy transfer unit under the selected device.

6. The docking station of claim 1, further comprising:
a wireless transceiver that communicates with the electrical device; and
a network link communicatively coupled to the wireless transceiver and a user interface to present content received from the electrical device.

7. The docking station of claim 1, further comprising:
a wireless transceiver that communicates with the electrical device; and
a data storage device communicatively coupled to the wireless transceiver for access by the electrical device.

8. The docking station of claim 1, wherein:
the mobile wireless energy transfer unit comprises a wireless transceiver that communicates with the electrical device; and
the docking system comprises a support processor communicatively coupled to the wireless transceiver to process data received from the electrical device.

9. The docking station of claim 1, further comprising:
a wireless transceiver that communicates with the electrical device; and
a wireless local access network (LAN) network interface controller (NIC) communicatively coupled to a WLAN.

10. The docking station of claim 1, further comprising a rechargeable battery power supply that powers the alignment system, the mobile wireless energy transfer unit, and the controller.

11. The docking station of claim 1, further comprising a table having the surface.

12. The docking station of claim 1, wherein the charging apparatus comprises a charging tray.

* * * * *